United States Patent
Walker et al.

(10) Patent No.: US 12,064,695 B2
(45) Date of Patent: Aug. 20, 2024

(54) SYSTEMS AND METHODS FOR HINDERING PLAY OF AN ADULT VIDEO GAME BY A CHILD AND FOR PROTECTING THE CHILD

(71) Applicant: Sony Interactive Entertainment LLC, San Mateo, CA (US)

(72) Inventors: Victoria Walker, Encinitas, CA (US); Benaisha Patel, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/877,624

(22) Filed: Jul. 29, 2022

(65) Prior Publication Data
US 2024/0033642 A1 Feb. 1, 2024

(51) Int. Cl.
| A63F 13/213 | (2014.01) |
| A63F 13/424 | (2014.01) |
| A63F 13/49  | (2014.01) |
| A63F 13/533 | (2014.01) |
| A63F 13/73  | (2014.01) |
| A63F 13/79  | (2014.01) |

(52) U.S. Cl.
CPC ............ *A63F 13/73* (2014.09); *A63F 13/213* (2014.09); *A63F 13/424* (2014.09); *A63F 13/49* (2014.09); *A63F 13/533* (2014.09); *A63F 13/79* (2014.09)

(58) Field of Classification Search
CPC .......... A63F 13/22; A63F 13/48; A63F 13/70; A63F 13/73; A63F 13/75; A63F 13/79; A63F 13/798; A63F 13/85
See application file for complete search history.

(56) References Cited

U.S. PATENT DOCUMENTS

| 11,123,641 | B2 * | 9/2021 | Asanuma | H04N 21/4532 |
| 11,272,023 | B1 * | 3/2022 | Everitt, Jr. | A63F 13/73 |
| 2006/0173793 | A1 * | 8/2006 | Glass | G06F 16/958 707/E17.116 |
| 2007/0111794 | A1 | 5/2007 | Hogan et al. | |
| 2009/0174702 | A1 * | 7/2009 | Garbow | G06Q 50/265 345/419 |
| 2010/0105481 | A2 | 4/2010 | Hogan et al. | |
| 2021/0373676 | A1 * | 12/2021 | Jorasch | G06Q 10/103 |

FOREIGN PATENT DOCUMENTS

| CN | 112434667 A | 3/2021 |
| CN | 113797555 A | 12/2021 |
| CN | 114159795 A | 3/2022 |
| EP | 4224345 A1 | 8/2023 |

OTHER PUBLICATIONS

PCT/US2023/070979 Invitation to Pay Additional Fees and, Where Applicable, Protest Fee, ISA206, European Patent Office, NL 2280 HV Rijswijk.

* cited by examiner

*Primary Examiner* — Omkar A Deodhar
(74) *Attorney, Agent, or Firm* — Penilla IP, APC

(57) ABSTRACT

Systems and methods for hindering play of an adult video game by a child and for protecting the child are described. One of the methods includes receiving an indication of access to the adult video game via an adult user account, determining whether a user accessing the adult video game is the child after receiving the indication of the access to the adult video game, and hindering the child from playing the adult video game upon determining that the user accessing the adult video game is the child.

17 Claims, 12 Drawing Sheets

(Kid Plays Mature Game using Adult Acct.)

(Kid Plays Mature Game using Adult Acct.)

(Game is blocked)

(Method for Hindering Use of an Adult Account)

(Train AI Profile Model To Determine Age of Child 1)

(Bad Behavior Toward Child 1)

(Adult Notified)

(Parental Controls Adjusted)

(Last Warning!)

(Method for Reducing Bad Behavior Towards Children)

(Train AI Profile Model To Recognize Bad Content)

SYSTEMS AND METHODS FOR HINDERING PLAY OF AN ADULT VIDEO GAME BY A CHILD AND FOR PROTECTING THE CHILD

FIELD

The present disclosure relates to systems and methods for hindering play of an adult video game by a child and for protecting the child.

BACKGROUND

In a multi-player video game, there are adults and children playing the game. The use of these games have increased over the years with advancement in game graphics and features, such as gameplay characters, and game technologies, such as gaming consoles and cloud gaming. The children and adults engage themselves in these video games for long periods of time because they find it enjoyable. It is important that these experiences of playing video games continue to be fun and enjoyable for adults and children alike.

It is in this context that embodiments of the invention arise.

SUMMARY

Embodiments of the present disclosure provide systems and methods for hindering play of an adult video game by a child and for protecting the child.

In one embodiment, a method for hindering play of an adult video game by a child is described. The method includes receiving an indication of access to the adult video game via an adult user account, determining whether a user accessing the adult video game is the child after receiving the indication of the access to the adult video game, and hindering the child from playing the adult video game upon determining that the user accessing the adult video game is the child.

In an embodiment, a server for hindering a play of an adult video game by a child is described. The server includes a processor that receives an indication of access to an adult video game via an adult user account and determines whether a user accessing the adult video game is the child after receiving the indication of the access to the adult video game. The processor hinders the child from playing the adult video game upon determining that the user accessing the adult video game is the child. The server includes a memory device coupled to the processor.

In one embodiment, a client device for hindering a play of an adult video game by a child is described. The client device includes a processor that receives an indication of access to an adult video game via an adult user account and determines whether a user accessing the adult video game is the child after receiving the indication of the access to the adult video game. The processor hinders the child from playing the adult video game upon determining that the user accessing the adult video game is the child. The client device includes a memory device coupled to the processor.

In an embodiment, a method for determining inappropriate behavior towards a child while playing a game is described. The method includes determining that inappropriate content is received within a child user account, identifying an adult user account from which the inappropriate content is received, and providing a warning to the adult user account upon receiving the inappropriate content. The method further includes determining whether the child user account receives additional inappropriate content after the warning is provided and sending a final warning to the adult user account upon determining that the child user account receives the additional inappropriate content.

Some advantages of the herein described systems and methods include identifying access to an adult video game by a child, and executing operations to hinder access to the adult video game. Sometimes, the child gains access to the adult video game via an adult user account. To hinder continued access to the adult video game, the systems and methods described herein determine that a user accessing the adult video game via the adult user account is the child, and execute the operations, such as block access to the adult video game or notify an adult administrator or a combination thereof.

Additional advantages of the herein described systems and methods include protecting children from bad behavior during a game session. The systems and methods determine whether there is inappropriate behavior during the game session towards the child. Upon determining so, the systems and methods implement progressive or successive operations to protect the child. For example, the systems and methods notify a user who engages in the inappropriate behavior regarding the inappropriate behavior. Eventually, the systems and methods hinder, such as block, the inappropriate behavior.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for identifying and protecting a child during a play of a game are described. It should be noted that various embodiments of the present disclosure are practiced without some or all of these specific details. In other instances, well known process operations have not been described in detail in order not to unnecessarily obscure various embodiments of the present disclosure.

Figure 1:
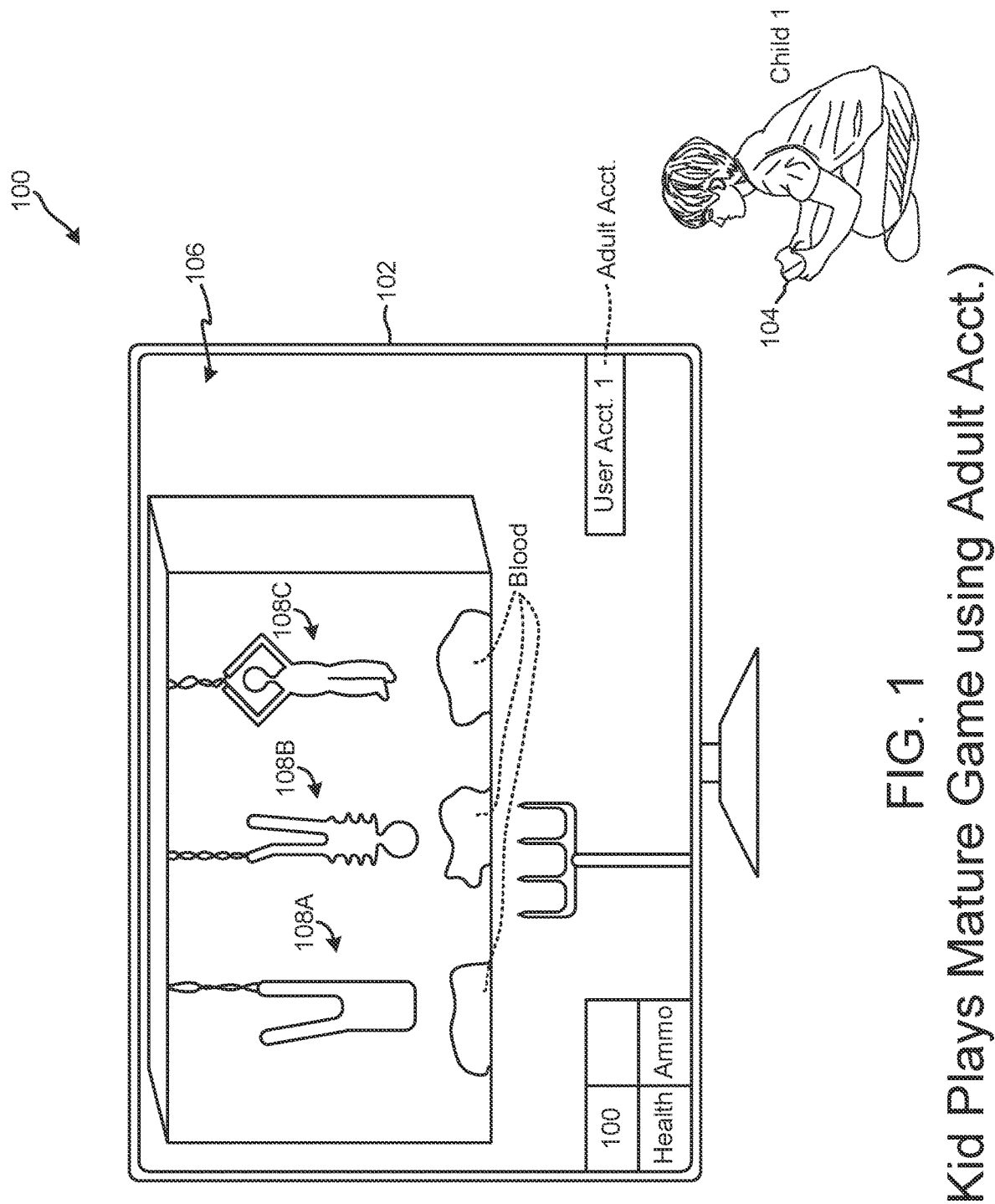
FIG. 1 is a diagram of an embodiment of a system to illustrate use of a user account, assigned to an adult administrator, by a child user.

FIG. 1 is a diagram of an embodiment of a system 100 to illustrate use of a user account 1, assigned to an adult administrator, by a child user. As an example, an account server requests user information, such as a name of a user, an age of the user, and a proof of the age, to assign a user account to the user. In the example, the user information is stored by the account server within a user profile of the user. Further, in the example, the user is the adult administrator or the child user.

The child user is illustrated as child 1 in FIG. 1. Examples of the adult administrator include a parent of the child 1, an adult sibling of the child 1, and a guardian of the child 1. To illustrate, the adult administrator is an adult user, such as an adult person, who is at least 18 years old. The system 100 includes a display device 102. The child 1 uses a hand-held controller 104 to access a game session of an adult video game to further access a scene 106, which is displayed on the display device 102. As an example, a game session starts when a user logs into the user's account and ends when the user logs out of the user's account.

The scene 106 is of the adult video game not meant for access by children. For example, the adult video game is assigned a rating of mature, adults only, or rating pending. To illustrate the scene 106 shows bodies 108A, 108B, and 108C that are chopped off or cut off, and there is blood in a floor within the scene 106. To further illustrate, the adult video game has scenes depicting intense violence, sexual content, blood and gore, strong language, or a combination thereof.

The child 1 accesses the scene 106 during the game session via the user account 1. For example, the user account 1 is assigned by a processor of a computing device system to the adult administrator. To illustrate, the processor of the computing device system requests proof from the adult administrator by generating a notification for display on the display device 102 regarding an age of the adult administrator. In the illustration, in response to the request for proof, the adult administrator holds an identification card of the adult administrator indicating the age in front of a camera that is coupled to the processor of the computing device system. In the illustration, the camera captures an image of the identification card and provides the image to the processor of the computing device system. Further, in the illustration, upon receiving the image, the processor of the computing device system parses the images to determine that the age of the adult administrator is at least 18. In the illustration, upon determining that the age of the adult administrator is at least 18, the processor of the computing device designates the user account 1 as being assigned to an adult person.

In the example, the child 1 gains access to the adult video game via the user account 1. To illustrate, the adult administrator left playing the adult video game, forgets to log out of the user account 1, and the child 1 obtains the hand-held controller 104 and starts playing the adult video game. As another illustration, the child somehow figures out a username and a password for the user account 1, uses the hand-held controller 104 to access the user account 1, and starts playing the adult video game.

Examples of the computing device system include one or more servers, one or more client devices, a combination of the one or more servers and the one or more client devices. To illustrate, the computing device system is a game console or a server. As another illustration, the computing device system includes a computer and a server or a smartphone and a server or a smart television and a server. Examples of a client device include the smartphone, the hand-held controller 104, the game console, a combination of the hand-held controller 104 and the display device 102, and a combination of the game console, the hand-held controller 104, and the display device 102. Examples of a display device, as described herein, include a computer monitor, a head-mounted display (HMD), a television, and a smart phone, and a smart television. To illustrate, the display device is a liquid crystal display (LCD), or a light emitting diode (LED) display, or a plasma display.

Figure 2:
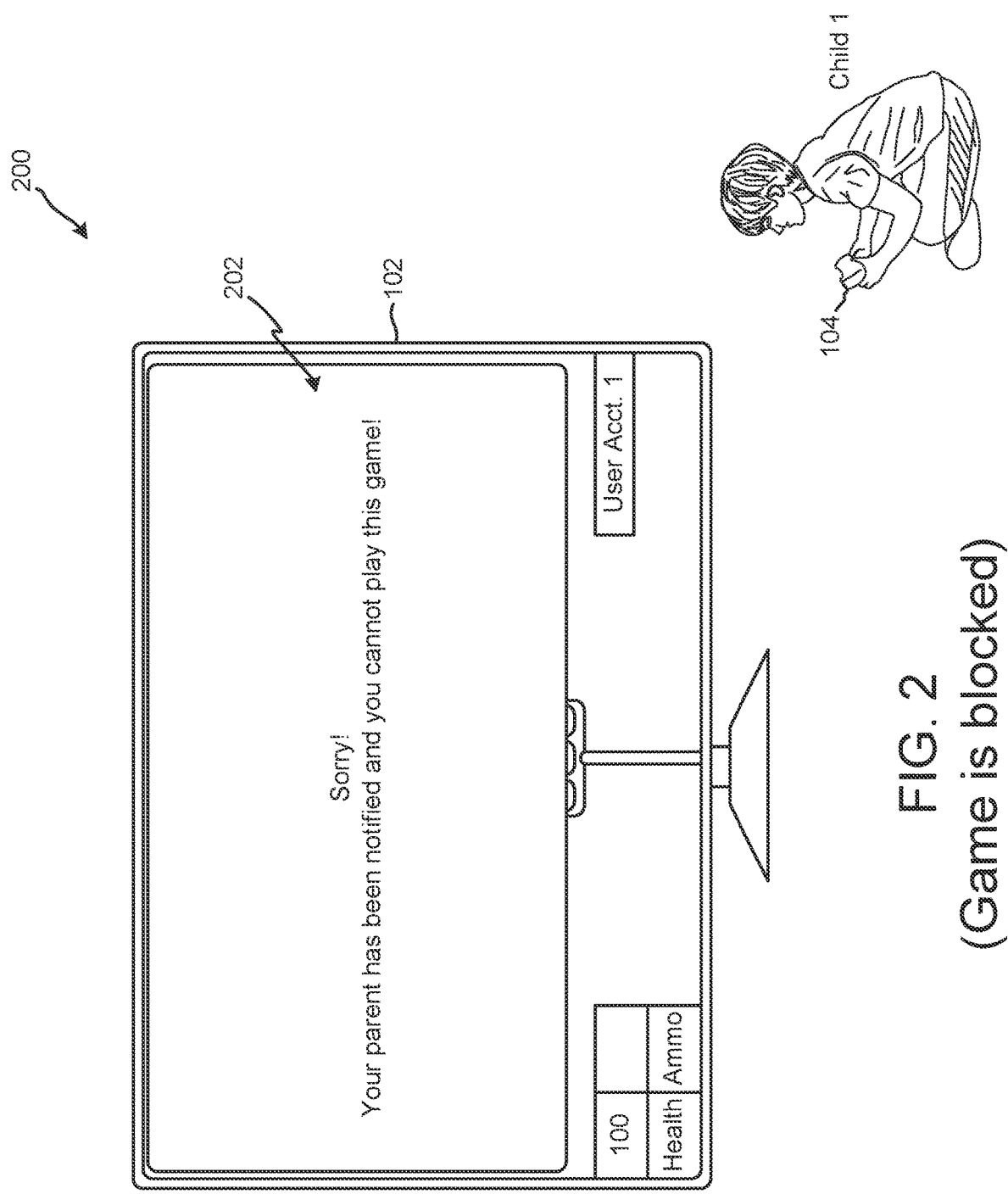
FIG. 2 is a diagram of an embodiment of the system to illustrate that a processor of a computing device system displays a notification to prevent the child user from playing an adult video game.

FIG. 2 is a diagram of an embodiment of the system 200 to illustrate that the processor of the computing device system displays a notification 202 to prevent the child 1 from playing the adult video game Immediately after the child 1 accesses the scene 106 (FIG. 1) via the user account 1, the processor of the computing device generates the notification 202 for display on the display device 102. As an example, the notification 202 indicates that the adult administrator has been notified that the child 1 is playing the adult video game and that the child 1 cannot play the adult video game.

Figure 3:
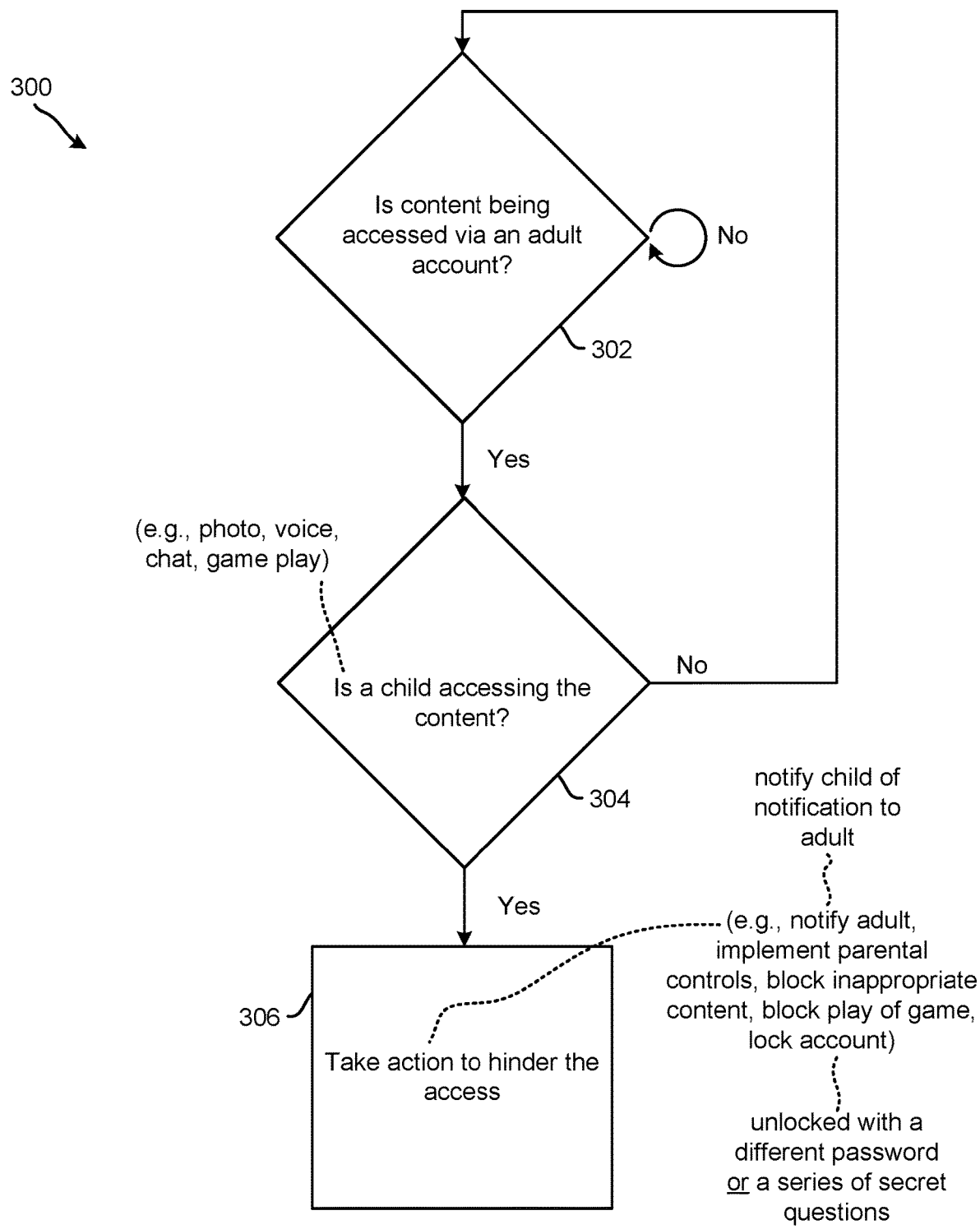
FIG. 3 is a flowchart of an embodiment of a method for hindering access to the user account by the child user.

FIG. 3 is a flowchart of an embodiment of a method 300 for hindering access of the child 1 to the adult video game via the user account 1. The method 300 is executed by one or more processors of the computing device system.

In an operation 302 of the method 300, one or more processors of the computing device system determine whether adult content is being accessed via the user account 1. For example, the one or more processors of the computing device system determine whether the adult video game is being played, such as whether the scene 106 is displayed on the display device 102 (FIG. 1), after the user account 1 is accessed. To illustrate, the one or more processors of the computing device system send a request to the account server of the computing device system to determine whether a user, such as the child 1 or the adult administrator, is logged into the user account 1. In the illustration, upon receiving the request, the account server provides a response to the request indicating that the user is logged into or not logged into the user account 1. Moreover, in the illustration, upon receiving the response that the user is logged into the user account 1, the one or more processors of the computing device system send a request to a game server of the computing device system to determine whether the adult video game is being accessed from the game server. In the illustration, in response to the request, the game server sends an indication to the one or more processors of the computing device system indicating that the adult video game is being accessed or not being accessed. In the illustration, upon receiving the indication that the adult video game is being accessed, the one or more processors of the computing device system determine that the content, such as the adult video game, is being accessed via the user account 1. Further, in the illustration, upon receiving the indication that the user is not logged into the user account 1 or that the adult video game is not being accessed, the one or more processors of the computing device system determine that the adult content is not being accessed via the user account 1.

Upon determining that the adult content is not being accessed via the user account 1, the one or more processors of the computing device system continue to determine whether the adult content is being accessed via the user account 1. On the other hand, upon determining that the adult content is not being accessed via the user account 1, the one or more processors of the computing device system execute an operation 304 of the method 300 to determine whether the child 1 is accessing the adult content. For example, the one or more processors of the computing device system determine from characteristics of game play of the adult video game, or characteristics of an image of the child 1, or characteristics of a voice of the child 1, or characteristics of chat by the child 1 during a chat session while playing the adult video game, or a combination thereof, whether the adult video game is accessed by the child 1. To illustrate, upon receiving an indication from an age profile model that age identification data regarding the child 1 indicates that the user is the child 1, the one or more processors of the computing device system determine that the adult video game is accessed by the child 1 and not the adult administrator. In the illustration, on the other hand, upon receiving an indication from the age profile model that the age identification data regarding the child 1 indicates that the user is not the child 1, the one or more processors of the computing device system determine that the adult video game is not accessed by the child 1 and is accessed by the adult administrator. In the example, upon determining that the adult video game is not accessed by the child 1, the one or more processors of the computing device system determine that the adult content is not accessed by the child 1. On the other hand, in the example, upon determining that the adult video game is accessed by the child 1, the one or more processors of the computing device system determine that the adult content is accessed by the child 1.

It should be noted that a chat session, as described herein, occurs via an in-game chat during a game session or an external application during the game session. For example, the in-game chat occurs as a sidebar window or an in-game overlay chat window to a game scene, such as the scene 106 (FIG. 1). In the example, a user does not need to provide user information, such as a username and a password, to access a chat account to further access the in-game chat after providing user information to access a user account to further access the game session. In the example, the external application is accessed by the user via an external application account that is different from the user account used to access the game session. In the example, the one or more processors of the computing device system execute a chat software to initiate the chat session in which display data for displaying a chat window, such as the sidebar window or the in-game overlay chat window, is generated. Also, in the example, the one or more processors of the computing device system execute the external application to start a chat session in which data for displaying a chat window is generated.

Upon determining that the content is not accessed by the child 1, the one or more processors of the computing device system do not hinder access to the adult content via the user account 1 and repeat the operation 302. For example, the one or more processors of the computing device system do not generate the notification 202 and allow continued access to the scene 106 (FIG. 1). On the other hand, in response to determining that the adult content is accessed by the child 1 via the user account 1, the one or more processors of the computing device system execute an operation 306 to hinder the access to the adult video game. For example, the one or more processors of the computing device system generate display data for displaying the notification 202 on the display device 102 via the user account 1.

Further, in the example, instead of or in addition to generating the display data for the notification 202, the one or more processors of the computing device system provide an instruction to the display device 102 to overlay the notification 202 on the scene 106 (FIG. 1) and any subsequent scenes of the adult video game to cover the scene 106 and the subsequent scenes. In the example, the notification 202 blocks content, such as the scene 106 and the subsequent scenes, of the adult video game. In the example, the one or more processors of the computing device system send a notification to the client device that is operated by the adult administrator that the child 1 is playing the adult video game. To illustrate, the one or more processors of the computing device system send an email to an email account assigned by an email server to the client device operated by the adult administrator. In the illustration, the email account is registered with the one or more processors of the computing device system for access to the user account 1.

As another example, the one or more processors of the computing device system disable, such as block, access to the user account 1 by the child 1. To illustrate, the one or more processors of the computing device system send a request to the account server to block the access to the user account 1. In the illustration, upon receiving the request, the account server logs the child 1 out of the user account 1. In the illustration, after the user account 1 is blocked, the one or more processors of the computing device send an email to the adult user that the user account 1 is blocked. Moreover, in the illustration, the one or more processors of the computing device request special information, such as a special user password or a phone call to an entity that manages the user account 1, via the email assigned to the adult administrator for unblocking the user account 1. In the illustration, the special information is different from the user information for accessing the user account 1.

As yet another example, the one or more processors of the computing device system implement parental controls within the user account 1. To illustrate, the parental controls exists within a user account 2, which is assigned to the child 1. In the illustration, one or more processors access the parental controls from the user account 2 and apply the parental controls to the user account 1. Examples of the parental controls include disabling access to the adult video game or monitoring a time period during which the adult video game is accessed via the user account 1 or a combination thereof. The method 300 repeats after the operation 306.

In one embodiment, the account server is a server of the computing device system. In an embodiment, the game server is a server of the computing device system. In one embodiment, the email server is a server of the computing device system.

Figure 4:
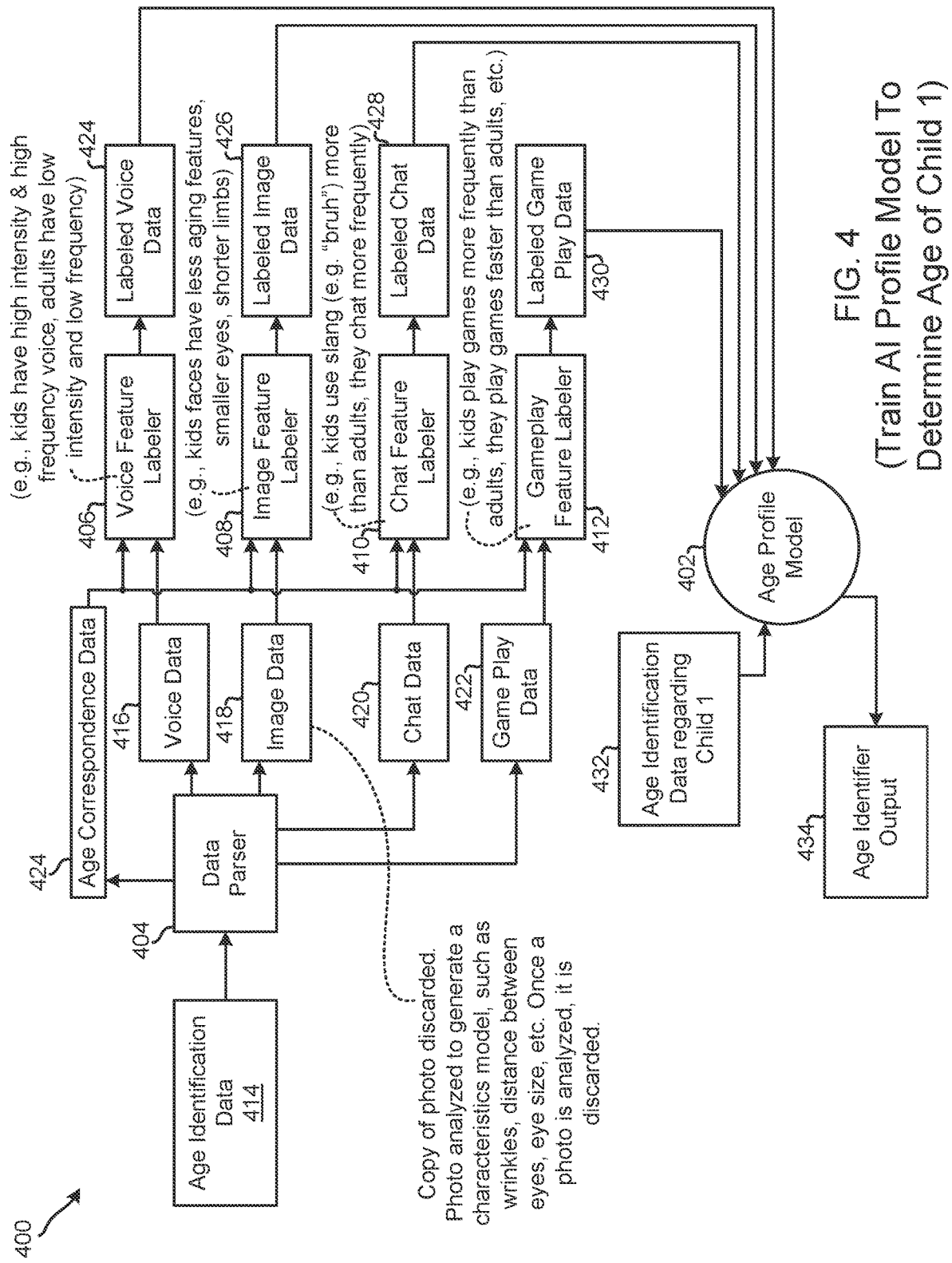
FIG. 4 is a diagram of an embodiment of a system to illustrate user of an age profile model to determine whether a user is the child user or the adult administrator.

FIG. 4 is a diagram of an embodiment of a system 400 to illustrate use of an age profile model 402 to determine whether the user is the child 1 or the adult administrator. The system 400 includes a data parser 404, a voice feature labeler 406, an image feature labeler 408, a chat feature labeler 410, a gameplay feature labeler 412, and the age profile model 402. As an example, each of the data parser 404, the voice feature labeler 406, the image feature labeler 408, the chat feature labeler 410, the gameplay feature labeler 412, and the age profile model 402 is a hardware component or a software component. To illustrate, each of the data parser 404, the voice feature labeler 406, the image feature labeler 408, the chat feature labeler 410, the gameplay feature labeler 412, and the age profile model 402 is a software program or a portion of a software program that is executed by an artificial intelligence (AI) processor. To further illustrate, the age profile model 402 is a machine learning model or a neural network or an AI model. As another illustration, each of the data parser 404, the voice feature labeler 406, the image feature labeler 408, the chat feature labeler 410, the gameplay feature labeler 412, and the age profile model 402 is a hardware circuit portion of an application specific integrated circuit (ASIC) or a programmable logic device (PLD). As yet another illustration, each of the data parser 404, the voice feature labeler 406, the image feature labeler 408, the chat feature labeler 410, the gameplay feature labeler 412, and the age profile model 402 are examples of the one or more processors of the computing device system.

The data parser 404 is coupled to the voice feature labeler 406, the image feature labeler 408, the chat feature labeler 410, and the gameplay feature labeler 412. Moreover, the voice feature labeler 406, the image feature labeler 408, the chat feature labeler 410, and the gameplay feature labeler 412 are coupled to the age profile model 402.

The data parser 404 receives age identification data 414. For example, the data parser 404 receives voice data 416 captured by multiple microphones and the voice data 416 represents sounds uttered by people, such as users. In the example, the voice data 416 is generated during one or more game sessions of one or more video games. In the examples, the microphones are coupled to the data parser 404. As another example, the data parser 404 requests and in response to the requests, receives image data 418 captured by multiple cameras of the people, such as faces and limbs of the people, sitting in front of the cameras. In the example, the image data 418 is generated during the one or more game sessions of the one or more video games. In the example, the data parser 404 is coupled to the each of cameras. As yet another example, the data parser 404 requests and in response to the requests, receives chat data 420 from the client devices that are operated by multiple users. In the example, the chat data 420 is generated during one or more chat sessions that occur during the one or more game sessions of the one or more video games. To illustrate, each user chats during one or more game sessions of one or more video games with another user via a respective client device and the chat software, such as an instant messaging software. In the illustration, the instant messaging software is executed by the one or more processors of the computing device system. Further, in the illustration, when the users chat with each other, the chat data 420 is generated at the client devices. In the illustration, the chat data 420 is sent from the client devices to the one or more processors of the computing device system. Also, in the illustration, the client devices are coupled to the one or more processors of the computing device system. As another example, the data parser 404 receives gameplay data 422 regarding different ways in which the video games are played by the users during the game sessions. To illustrate, the data parser 404 requests and in response to the requests, receives from the client devices control input data. In the illustration, the control input data indicates frequencies of selection of buttons of hand-held controllers operated by the users, identifiers of the buttons selected, and movements, such as positions and orientation, of the hand-held controllers by the users, during the game sessions.

The data parser 404 parses the age identification data 414 to identify the voice data 416, the image data 418, the chat data 420, and the gameplay data 422. For example, upon determining that data is received from the microphones, the data parser 404 determines that the data is the voice data 416. Further in the example, in response to determining that data is received from the cameras, the data parser 404 determines that the data is the voice data 418. Also, in the example, in response to determining that data is received from the chat software or that the data received is alphanumeric characters, such as terms, the data parser 404 determines that the data is the chat data 420. Examples of the terms include text or words or phrases or sentences or statements or slangs or icons or symbols or a combination thereof. Moreover, in the example, upon determining that the control input data is received from the hand-held controllers, during game sessions, indicating selections of the buttons on the hand-held controllers or movements of the hand-held controllers or a combination thereof, the data parser 404 determines that the gameplay data 422 is received.

As another example, upon determining that data within the age identification data 414 includes voice characteristics, such as amplitudes or frequencies or a combination thereof, the data parser 404 determines that the data is the voice data 416. Further in the example, in response to determining that data within the age identification data 414 includes image characteristics, such as shapes of body part features, colors, intensities, and textures of the body part features, the data parser 404 determines that the data is the image data 418. To illustrate, the body part features includes features, such as shapes, sizes, and locations, of body parts. In the illustration, the body part features includes distances between any two body parts. To further illustrate, the body parts include eyes, noses, faces, lips, chins, foreheads, ears, and limbs. Moreover, in the example, upon determining that data within the age identification data 414 has chat characteristics, such as includes the alphanumeric characters, the data parser 404 determines that the data is the chat data 420. Also in the example, in response to determining that data within the age identification data is 414 includes gameplay characteristics, such as frequencies button selections or frequencies of hand-held controller movements, generated by the hand-held controllers in response to scenes, such as virtual reality (VR) scenes or augmented reality (AR) scenes, that are generated during or immediately before or after the game sessions of the video games, the data parser 404 determines that the data is the gameplay data 422.

Moreover, the data parser 404 parses the age identification data 414 to identify age correspondence data 424. For example, each user account includes a user profile having an age, such as 18 and above or below 18, of a user assigned the user account. In the example, the user accesses a game session after logging into the user account. In the example, the age correspondence data 424 includes an association, such as a one-to-one correspondence, between the voice data 416 of the user and the age of the user, an association between the image data 418 of the user and the age of the user, an association between the chat data 420 of chat by the user and the age of the user, and an association between the gameplay data 420 generated from a hand-held controller operated by the user and the age of the user.

With the provision of the voice data 416 to the voice feature labeler 406, the one or more processors of the computing device system provide the age correspondence data 424 to the voice feature labeler 406. Similarly, with the provision of the image data 418 to the image feature labeler 408, the one or more processors of the computing device system provide the age correspondence data 424 to the image feature labeler 408. Also, with the provision of the chat data 420 to the chat feature labeler 410, the one or more processors of the computing device system provide the age correspondence data 424 to the chat feature labeler 410. With the provision of the gameplay data 424 to the gameplay feature labeler 412, the one or more processors of the computing device system provide the age correspondence data 424 to the gameplay feature labeler 412.

The voice feature labeler 406 determines voice characteristics, such as amplitudes or frequencies or a combination thereof, from the voice data 416. For example, the voice feature labeler 406 applies fast Fourier transform to the voice data 416 to determine frequencies of the voice data 416. In the example, the voice data 416 is audio data that includes amplitudes of the voice data. To illustrate, the voice data 416 includes samples, and each sample is an amplitude, such as an intensity. In the illustration, the voice feature labeler 406 identifies the amplitudes of the samples to determine the amplitudes from the voice data 416.

Moreover, based on the amplitudes and the frequencies determined from the voice data 416 and based on the age correspondence data 424, the voice feature labeler 406 determines that a first set of voice characteristics, such as a first set of amplitudes or a first set of frequencies or a combination thereof, correspond to adult administrators, such as adult users, and a second set of voice characteristics, such as a second set of amplitudes or a second set of frequencies or a combination thereof, correspond to child users. To illustrate, the voice feature labeler 406 compares the amplitudes determined from the voice data 416 with a predetermined amplitude to determine that the first set of amplitudes from the amplitudes that are identified from the voice data 416 are greater than the predetermined amplitude. Moreover, in the illustration, the voice feature labeler 406 determines that the first set of amplitudes are associated with the adult administrators upon determining, from the age correspondence data 424, that the first set of amplitudes correspond to ages 18 and above. Further, in the illustration, the voice feature labeler 406 compares the amplitudes determined from the voice data 416 with the predetermined amplitude to determine that the second set of amplitudes from the amplitudes that are identified from the voice data 416 are less than the predetermined amplitude. Moreover, in the illustration, the voice feature labeler 406 determines that the second set of amplitudes are associated with the child users upon determining, from the age correspondence data 424, that the second set of amplitudes correspond to ages below 18.

In the illustration, the voice feature labeler 406 compares the frequencies determined from the voice data 416 with a predetermined frequency to determine that the first set of frequencies are greater than the predetermined frequency. Also, in the illustration, the voice feature labeler 406 determines that the first set of frequencies are associated with the adult administrators upon determining, from the age correspondence data 424, that the first set of frequencies correspond to ages 18 and above. Also, in the illustration, the voice feature labeler 406 compares the frequencies determined from the voice data 416 with the predetermined frequency to determine that the second set of frequencies are less than the predetermined frequency. Moreover, in the illustration, the voice feature labeler 406 determines that the second set of frequencies are associated with the child users upon determining, from the age correspondence data 424, that the second set of frequencies correspond to ages below 18. The correspondences between the first set of voice characteristics and the adult administrators, and between the second set of voice characteristics and the child users are provided as labeled voice data 424 by the voice feature labeler 406 to the age profile model 402.

Furthermore, based on the image characteristics of the image data 418 and based on the age correspondence data 424, the image feature labeler 408 determines that a first set of image characteristics correspond to adult administrators and a second set of image characteristics correspond to child users. To illustrate, the image feature labeler 408 compares the first set of image characteristics identified from the image data 418 with a first predetermined set of image characteristics to determine that the first set of image characteristics are similar to or the same as the first predetermined set of image characteristics. To further illustrate, the image feature labeler 408 compares a color of the first set of image characteristics with a first predetermined color to determine that the color has an intensity within a range from the first predetermined color or that the color is the same as the first predetermined color to determine that the color is of body parts of adult administrators. In the further illustration, the image feature labeler 408 compares features of body parts, such as a size of an eye or a size of a limb or pupillary distances between two eyes of each of the users, within the first set of image characteristics with a first predetermined size to determine that the body parts have a size within a range from a first predetermined size or that the body parts have the first predetermined size to further determine that the body parts are of the adult administrators. Also, in the illustration, the image feature labeler 408 determines that the first set of image characteristics are associated with the adult administrators upon determining, from the age correspondence data 424, that the first set of image characteristics correspond to ages 18 and above.

Moreover, in the illustration, the image feature labeler 408 compares the second set of image characteristics identified from the image data 418 with a second set of predetermined set of image characteristics to determine that the second set of image characteristics are similar to or the same as the second predetermined set of image characteristics. To further illustrate, the image feature labeler 408 compares a color of the second set of image characteristics with a second predetermined color to determine that the color has an intensity within a range from the second predetermined color or that the color is the same as the second predetermined color to determine that the color is body parts of child users. In the further illustration, the image feature labeler 408 compares features of body parts, such as a size of an eye or a size of a limb or pupillary distances between two eyes of each of the users, within the second set of image characteristics with a second predetermined size to determine that the body parts have a size within a range from the second predetermined size or that the body part has the second predetermined size to further determine that the body part is of the child users. Also, in the illustration, the image feature labeler 408 determines that the second set of image characteristics are associated with the child users upon determining, from the age correspondence data 424, that the second set of image characteristics correspond to ages below 18. In the illustration, the first predetermined size is larger than the second predetermined size and the second predetermined color is different from the first predetermined color. The correspondences between the first set of image characteristics and the adult administrators, and between the second set of image characteristics and the child users are provided as labeled image data 426 by the image feature labeler 408 to the age profile model 402.

Also, based on the chat characteristics of the chat data 420 and based on the age correspondence data 424, the chat feature labeler 410 determines that a first set of chat characteristics correspond to adult administrators and a second set of chat characteristics correspond to child users. To illustrate, the chat feature labeler 410 compares the first set of chat characteristics identified from the chat data 420 with a first predetermined set of chat characteristics to determine that the first set of chat characteristics are similar to or the same as the first predetermined set of chat characteristics. To further illustrate, the chat feature labeler 410 compares alphanumeric characters, such as terms, of the first set of chat characteristics with the first predetermined set to determine that the first set of chat characteristics are the same as the first predetermined set of chat characteristics to determine that the first set of chat characteristics are used by the adult administrators. In the further illustration, the chat feature labeler 410 compares a first frequency of occurrence of the first set of chat characteristics with a first predetermined frequency of occurrence to determine that the first frequency of occurrence is within a range from the first predetermined frequency of occurrence or is equal to the first predetermined frequency of occurrence to determine that the first set of chat characteristics are produced by the adult administrators. In the further illustration, the chat feature labeler 410 determines the first frequency of occurrence based on how many times the first set of chat characteristics occur within the chat data 420 in a predetermined time interval. Also, in the illustration, the chat feature labeler 410 determines that the first set of chat characteristics are associated with the adult administrators upon determining, from the age correspondence data 424, that the first set of chat characteristics correspond to ages 18 and above.

Moreover, in the illustration, the chat feature labeler 410 compares the second set of chat characteristics identified from the chat data 420 with a second predetermined set of chat characteristics to determine that the second set of chat characteristics are similar to or the same as the second predetermined set of chat characteristics. To further illustrate, the chat feature labeler 410 compares alphanumeric characters, such as terms, of the second set of chat characteristics with the second predetermined set of chat characteristics to determine that the second set of chat characteristics are the same as the second predetermined set of chat characteristics to further determine that the second set of chat characteristics are used by the child users. In the further illustration, the chat feature labeler 410 compares a second frequency of occurrence of the second set of chat characteristics with a second predetermined frequency of occurrence to determine that the second frequency of occurrence is within a range from the second predetermined frequency of occurrence or is equal to the second predetermined frequency of occurrence to further determine that the second set of chat characteristics are produced by the child users. In the further illustration, the chat feature labeler 410 determines the second frequency of occurrence based on how many times the second set of chat characteristics occur within the chat data 420 in the predetermined time interval. In the illustration, the second predetermined frequency is greater than the first predetermined frequency. To further illustrate, the child users access chat sessions more frequently than the adult administrators or posts a greater number of chats during a chat session than the adult administrators or a combination thereof. Moreover, in the illustration, the first predetermined set excludes slangs or includes slangs that are different than the slangs of the second predetermined set. To further illustrate, the adult administrators do not use any slangs during a chat session or use different slangs than used by the child users or uses the same slangs as that used by the child users but less frequently. In the further illustration, the child users use words, such as "bruh" or "whaz up" or "chill", and the adult administrators do not. Also, in the illustration, the chat feature labeler 410 determines that the second set of chat characteristics are associated with the child users upon determining, from the age correspondence data 424, that the second set of chat characteristics correspond to ages below 18. The correspondences between the first set of chat characteristics and the adult administrators, and between the second set of chat characteristics and the child users are provided as labeled chat data 428 by the chat feature labeler 410 to the age profile model 402.

Also, based on the gameplay characteristics of the gameplay data 422 and based on the age correspondence data 424, the gameplay feature labeler 412 determines that a first set of gameplay characteristics correspond to adult administrators and a second set of gameplay characteristics correspond to child users. To illustrate, the gameplay feature labeler 412 calculates, from the gameplay data 422, frequencies of selections of buttons of each of the hand-held controllers or frequencies of movements of each of the hand-held controllers or a combination thereof. In the illustration, the gameplay feature labeler 412 compares the first set of gameplay characteristics identified from the gameplay data 422 with a first predetermined set of gameplay characteristics to determine that the first set of gameplay characteristics are similar to or the same as the first predetermined set of gameplay characteristics. To further illustrate, the gameplay feature labeler 412 compares a first frequency with which buttons of hand-held controllers are selected with a first predetermined frequency of the first predetermined set of gameplay characteristics to determine that the first frequency is equal to the first predetermined frequency of gameplay characteristics or within a first predetermined range from the first predetermined frequency of gameplay characteristics to further determine that the first set of gameplay characteristics are generated from use of the hand-held controllers by adult administrators. In the further illustration, the first frequency indicates how fast the buttons of the hand-held controllers are selected within a predetermined time period. Also, in the illustration, the gameplay feature labeler 412 determines that the first set of gameplay characteristics are associated with the adult administrators upon determining, from the age correspondence data 424, that the first set of gameplay characteristics correspond to ages 18 and above.

Moreover, in the illustration, the gameplay feature labeler 412 compares the second set of gameplay characteristics identified from the gameplay data 422 with a second predetermined set of gameplay characteristics to determine that the second set of gameplay characteristics are similar to or the same as the second predetermined set of gameplay characteristics. To further illustrate, the gameplay feature labeler 412 compares a second frequency with which buttons of hand-held controllers are selected with a second predetermined frequency of the second predetermined set to determine that the second frequency is equal to the second predetermined frequency or within a second predetermined range from the second predetermined frequency to further determine that the second set of gameplay characteristics are generated from use of the hand-held controllers by the child users. In the further illustration, the second frequency indicates how fast the buttons of the hand-held controllers are selected within the predetermined time period. Moreover, in the illustration, the first predetermined frequency is less than the second predetermined frequency. To further illustrate, the first predetermined frequency is less than the second predetermined frequency by 10% to 50%. Also, in the illustration, the gameplay feature labeler 412 determines that the second set of gameplay characteristics are associated with the child users upon determining, from the age correspondence data 424, that the second set of gameplay characteristics correspond to ages below 18. The correspondences between the first set of gameplay characteristics and the adult administrators, and between the second set of gameplay characteristics and the child users are provided as labeled gameplay data 430 by the gameplay feature labeler 412 to the age profile model 402.

It should be noted that upon identifying or determining the voice characteristics from the voice data 416, the voice data 416 is discarded by the voice feature labeler 406. For example, any audio files having the voice data 416 are deleted by the one or more processors of the computing device system from one or more memory devices of the computing device system. Examples of a memory device, as used herein, include a read-only memory (ROM) and a random access memory (RAM). Similarly, upon identifying the image characteristics from the image data 418, any images files having the image data 418 are deleted by the one or more processors of the computing device system from the one or more memory devices of the computing device system. Also, upon identifying or determining the chat characteristics from the chat data 420, any files having the chat data 420 are deleted by the one or more processors of the computing device system from the one or more memory devices of the computing device system.

The age profile model 402 is trained based on the labeled voice data 424, the labeled image data 426, the labeled chat data 428, and the labeled gameplay data 430. For example, the age profile model 402 receives the labeled voice data 424, the labeled image data 426, the labeled chat data 428, and the labeled gameplay data 430 and learns the correspondences among the first set of voice characteristics, the first set of image characteristics, the first set of chat characteristics, and the first set of gameplay characteristics and the adult administrators, and among the second set of voice characteristics, the second set of image characteristics, the second set of chat characteristics, and the second set of gameplay characteristics and the child users.

The age profile model 402 receives age identification data 432 regarding the user, such as the child 1 or the adult administrator, during the access of the game session of the adult video game, such as the scene 106 (FIG. 1). For example, the age profile model 402 receives voice data, within the age identification data 432, captured by a microphone that is coupled to the one or more processors of the computing device system and that is coupled to the display device 102 (FIG. 1). The microphone captures the voice data in a real-world environment in which the user, such as the child 1 or the adult administrator, is present. In the example, the age profile model 402 determines or identifies voice characteristics from the voice data generated by the microphone in the same manner in which the first and second sets of voice characteristics are determined from the voice data 416. Further, in the example, the age profile model 402 determines whether the voice characteristics are similar to or the same as the first set of voice characteristics or the second set of voice characteristics. To illustrate, the age profile model 402 determines that the voice characteristics of the age identification data 432 are within a preset voice threshold from or equal to the first set of voice characteristics. In the illustration, upon determining that the voice characteristics of the age identification data 432 are within the preset voice threshold from or equal to the first set of voice characteristics, the age profile model 402 determines that the voice characteristics of the age identification data 432 indicate that the user is the adult administrator. In the illustration, on the other hand, the age profile model 402 determines that the voice characteristics of the age identification data 432 are within the preset voice threshold from or equal to the second set of voice characteristics. Further, in the illustration, upon determining that the voice characteristics of the age identification data 432 are within the preset voice threshold from or equal to the second set of voice characteristics, the age profile model 402 determines that the voice characteristics of the age identification data 432 indicate that the user is the child user. In the illustration, the preset voice threshold from the first set of voice characteristics is exclusive of the preset voice threshold from the second set of voice characteristics.

As yet another example, the age profile model 402 receives image data, within the age identification data 432, captured by a camera that is coupled to the one or more processors of the computing device system and that is coupled to the display device 102. The camera captures the image data in the real-world environment in which the user, such as the child 1 or the adult administrator, is present. In the example, the age profile model 402 determines or identifies image characteristics from the image data generated by the camera in the same manner in which the first and second sets of image characteristics are determined from the image data 418. Further, in the example, the age profile model 402 determines whether the image characteristics are similar to or the same as the first set of image characteristics or the second set of image characteristics. To illustrate, the age profile model 402 determines that the image characteristics of the age identification data 432 are within a preset image threshold from or equal to the first set of image characteristics. In the illustration, upon determining that the image characteristics of the age identification data 432 are within the preset image threshold from or equal to the first set of image characteristics, the age profile model 402 determines that the image characteristics of the age identification data 432 indicate that the user is the adult administrator. In the illustration, on the other hand, the age profile model 402 determines that the image characteristics of the age identification data 432 are within the preset image threshold from or equal to the second set of image characteristics. Further, in the illustration, upon determining that the image characteristics of the age identification data 432 are within the preset image threshold from or equal to the second set of image characteristics, the age profile model 402 determines that the image characteristics of the age identification data 432 indicate that the user is the child user. In the illustration, the preset image threshold from the first set of image characteristics is exclusive of the preset image threshold from the second set of image characteristics.

As still another example, the age profile model 402 receives chat data, within the age identification data 432, captured by the client device operated by the user, such as the adult administrator or the child 1. In the example, the client device is coupled to the one or more processors of the computing device system. In the example, the age profile model 402 determines or identifies chat characteristics from the chat data in the same manner in which the first and second sets of chat characteristics are determined or identified from the chat data 420. Further, in the example, the age profile model 402 determines whether the chat characteristics are similar to or the same as the first set of chat characteristics or the second set of chat characteristics. To illustrate, the age profile model 402 determines that the chat characteristics of the age identification data 432 are within a preset chat threshold from or equal to the first set of chat characteristics. In the illustration, upon determining that the chat characteristics of the age identification data 432 are within the preset chat threshold from or equal to the first set of chat characteristics, the age profile model 402 determines that the chat characteristics of the age identification data 432 indicate that the user is the adult administrator. In the illustration, on the other hand, the age profile model 402 determines that the chat characteristics of the age identification data 432 are within the preset chat threshold from or equal to the second set of chat characteristics. Further, in the illustration, upon determining that the chat characteristics of the age identification data 432 are within the preset chat threshold from or equal to the second set of chat characteristics, the age profile model 402 determines that the chat characteristics of the age identification data 432 indicate that the user is the child user. In the illustration, the preset chat threshold from the first set of chat characteristics is exclusive of the preset chat threshold from the second set of chat characteristics.

As another example, the age profile model 402 receives gameplay data, within the age identification data 432, captured by the client device operated by the user, such as the adult administrator or the child 1. In the example, the client device is coupled to the one or more processors of the computing device system. In the example, the age profile model 402 determines or identifies gameplay characteristics from the gameplay data in the same manner in which the first and second sets of gameplay characteristics are determined or identified from the gameplay data 422. Further, in the example, the age profile model 402 determines whether the gameplay characteristics are similar to or the same as the first set of gameplay characteristics or the second set of gameplay characteristics. To illustrate, the age profile model 402 determines that the gameplay characteristics of the age identification data 432 are within a preset gameplay threshold from or equal to the first set of gameplay characteristics. In the illustration, upon determining that the gameplay characteristics of the age identification data 432 are within the preset gameplay threshold from or equal to the first set of gameplay characteristics, the age profile model 402 determines that the gameplay characteristics of the age identification data 432 indicate that the user is the adult administrator. In the illustration, on the other hand, the age profile model 402 determines that the gameplay characteristics of the age identification data 432 are within the preset gameplay threshold from or equal to the second set of gameplay characteristics. Further, in the illustration, upon determining that the gameplay characteristics of the age identification data 432 are within the preset gameplay threshold from or equal to the second set of gameplay characteristics, the age profile model 402 determines that the gameplay characteristics of the age identification data 432 indicate that the user is the child user. In the illustration, the preset gameplay threshold from the first set of gameplay characteristics is exclusive of the preset gameplay threshold from the second set of gameplay characteristics.

As another example, a combination of the voice characteristics, the image characteristics, the chat characteristics, and the gameplay characteristics of the age identification data 432 is used by the age profile model 402 to determine whether the user is the child user or the adult administrator. To illustrate, upon determining, based on three or more of the voice characteristics, the image characteristics, the chat characteristics, and the gameplay characteristics, that the user is the adult administrator, the age profile model 402 determines that the user is the adult administrator. In the illustration, on the other hand, upon determining, based on three or more of the voice characteristics, the image characteristics, the chat characteristics, and the gameplay characteristics, that the user is the child user, the age profile model 402 determines that the user is the child user.

The indication that the user is the child user or the adult administrator is an example of an age identification output 434. The age profile model 402 provides, such as outputs, the age identification output 434, which indicates that the user is the child user having an age below 18 years or the adult administrator having an age of at least 18 years.

Figure 5:
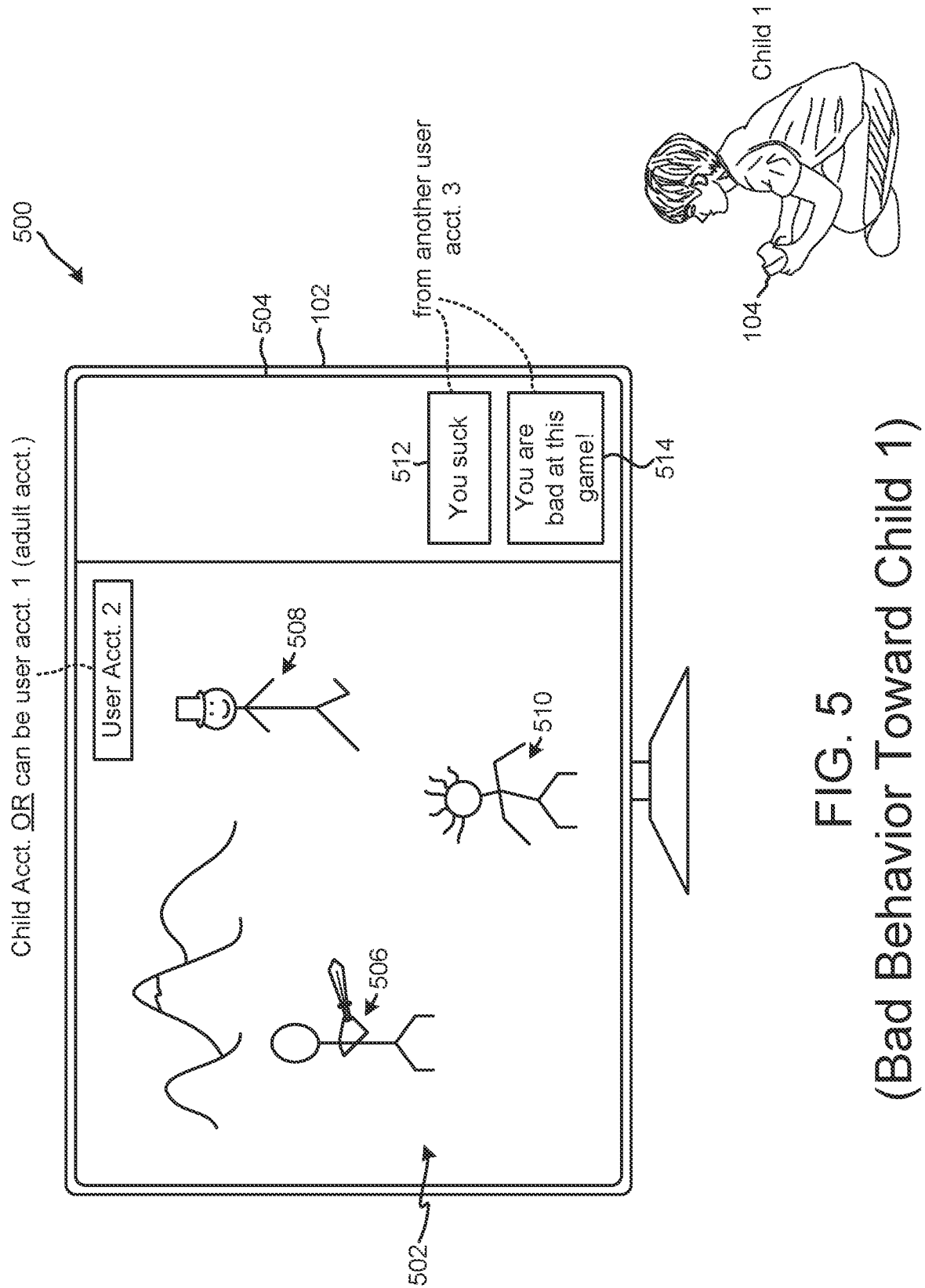
FIG. 5 is a diagram of an embodiment of a system to illustrate inappropriate behavior towards the child user.

FIG. 5 is a diagram of an embodiment of a system 500 to illustrate inappropriate behavior towards the child 1. The system 500 includes the display device 102. In the system 500, the child 1 accesses a video game such as a multi-player video game, from the one or more processors of the computing device system after logging into the user account 2. The one or more processors of the computing device system authenticate user information, such as a username and a password, to allow the child 1 to log into the user account 2. Upon accessing the video game after logging into the user account 1, the one or more processors of the computing device system generate display data for displaying a scene 502 of the video game on the display device 102. In the scene 502, a virtual character 506 is fighting against other virtual characters 508 and 510.

It should be noted that the user account 2 is a user account assigned by the account server to the child 1. As an example, the user account 2 includes a profile of the child 1 and the profile includes that the child 1 is below 18.

During a play of the video game having the scene 502, the inappropriate behavior occurs towards the child 1 via the user account 2. For example, one or more other users, such as an adult 1 (FIG. 6A), post inappropriate content in a chat window 504 that is displayed beside the scene 502. Display data for displaying the chat window 504 is generated during a chat session between the child 1 and one or more of the other users. The display data for displaying the chat window 504 is generated by the one or more processors of the computing device system.

Examples of the inappropriate content include audio content or video content or textual content or image content or a combination thereof that make children feel uncomfortable or hurt. To illustrate, the inappropriate comments include comments or images describing intense violence, sexual content, blood and gore, strong language, or a combination thereof. Illustrations of the inappropriate comments include comments that make children feel uncomfortable or hurt. To illustrate, one of the inappropriate comments is a comment 512, which includes terms, "You suck!", and another one of the inappropriate comments is a comment 514, which includes terms, "You are bad at this game!". As another illustration, the inappropriate comments are comments that are inappropriate according to a database. In the illustration, the database is created by a gaming industry or a gaming entity, such as a corporation.

In one embodiment, instead of logging into the user account 2, which is assigned to the child 1, the child 1 accesses the user account 1 (FIG. 1), assigned to the adult administrator to access the video game having the scene 502 or the adult video game having the scene 106 (FIG. 1). In the embodiment, the chat window 504 is generated to be displayed besides the scene 502 or 106.

Figure 6A:
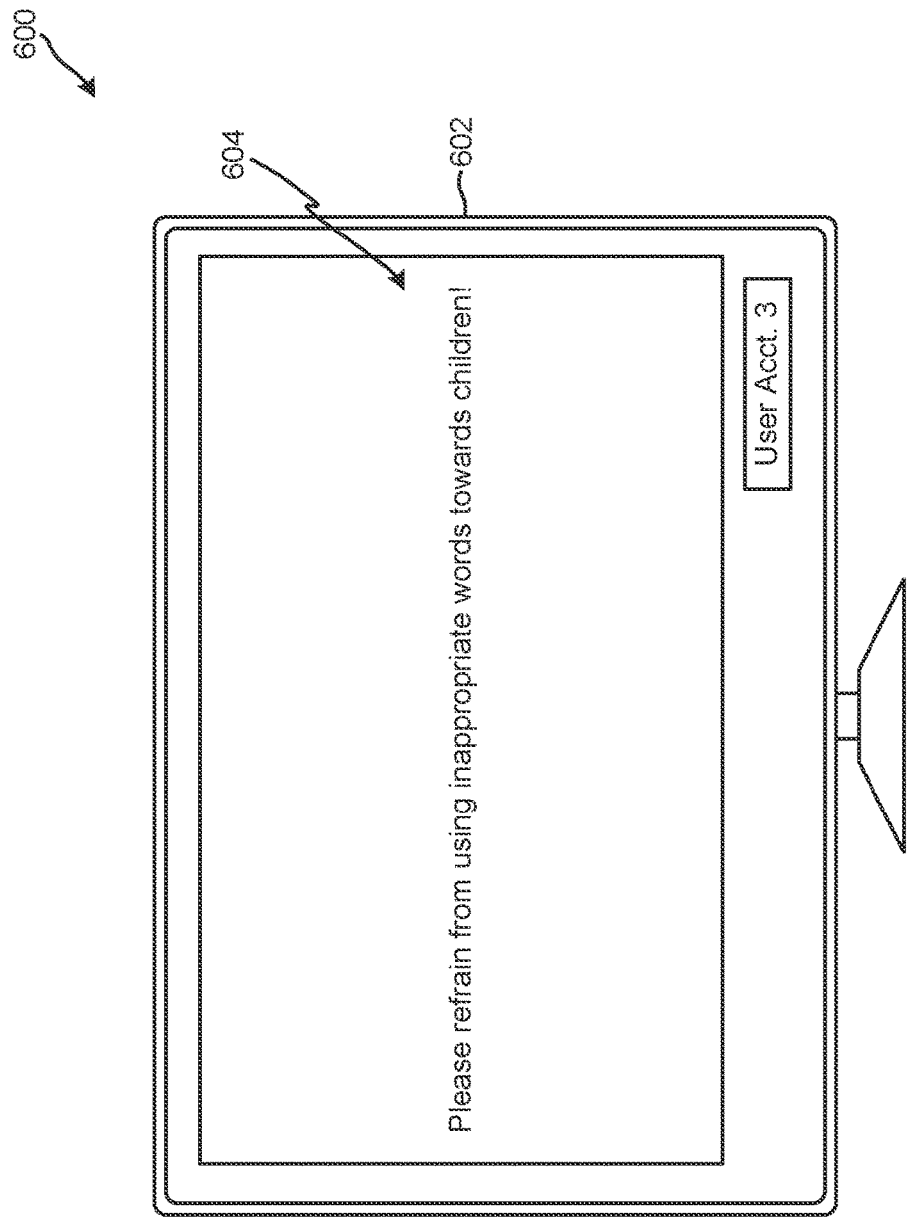
FIG. 6A is a diagram of an embodiment of a system to illustrate a notification that is provided via a user account to an adult user to hinder the adult user from conveying inappropriate content to a user account.
Figure 6A:
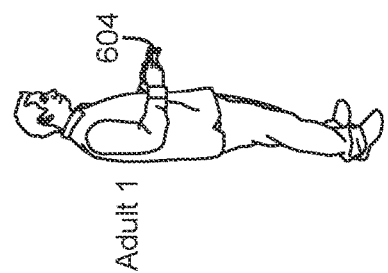

FIG. 6A is a diagram of an embodiment of a system 600 to illustrate a notification that is provided via a user account 3 to an adult user, such as the adult 1, to hinder the adult user from conveying the inappropriate content to the a user account, such as the user account 1 or the user account 2, accessed by the child 1. The system 600 includes a display device 602.

The adult 1 uses a hand-held controller 604 to log into the user account 3, which is assigned to the adult 1 by the account server. After logging into the user account 3, the adult 1 uses the hand-held controller 604 to initiate the chat session with the child 1 via the user accounts 3 and 2 or the user accounts 3 and 1. During the chat session, the adult 1 posts the inappropriate content in the chat window 504 (FIG. 5).

The one or more processors of the computing device determine whether content, such as the content posted within the chat window 504, conveyed to the user account, such as the user account 1 or 2, accessed by the child 1 via the user account 3 is inappropriate for the child 1. Upon determining that the content conveyed to the user account accessed by the child 1 is inappropriate, the one or more processors of the computing device system and generate display data for displaying a notification 604 via the user account 3 to indicate to the adult 1 to refrain from using inappropriate words towards children.

In one embodiment, instead of a user being the adult 1, the user is a child, other than the child 1.

Figure 6B:
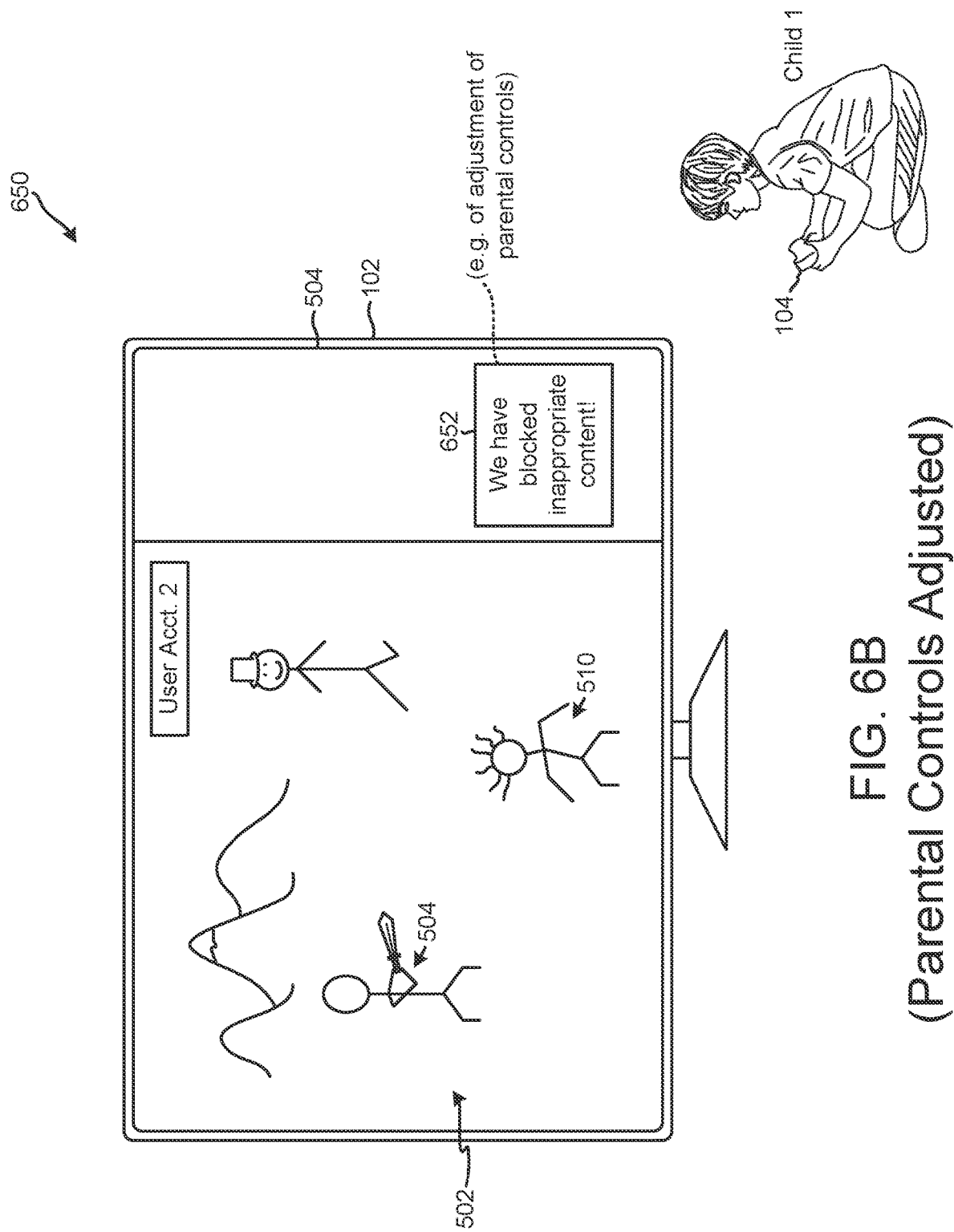
FIG. 6B is a diagram of an embodiment of a system to illustrate a manner in which the child user is protected against the inappropriate content by adjustment of parental controls.

FIG. 6B is a diagram of an embodiment of the system 650 to illustrate a manner in which the child 1 is protected against the inappropriate content by adjustment of parental controls. The system 650 includes the display device 102. The one or more processors of the computing device system determine whether content displayed on the display device 102 during the chat session accessed by the child 1 is inappropriate. Upon determining that the inappropriate content is provided via the user account accessed by the child 1, the one or more processors of the computing device system generate display data for displaying an overlay 652 to cover the inappropriate content. As an example, the one or more processors of the computing device system generate display data for displaying a parental control option via the display device 102 and the user account 1 assigned to the adult administrator. In the example, the parental control option indicates via the user account 1 assigned to the adult administrator that the inappropriate content will be blocked with an overlay if the adult administrator authorizes the overlay. Upon receiving a selection of the parental control option via the user account and the hand-held controller 104 operated by the adult administrator, the one or more processors of the computing device system generate display data for displaying the overlay 652 to block the inappropriate content.

In one embodiment, instead of logging into the user account 2, which is assigned to the child 1, the child 1 accesses the user account 1 (FIG. 1), assigned to the adult administrator to access the video game having the scene 502. In the embodiment, the chat window 504 is generated.

Figure 7:
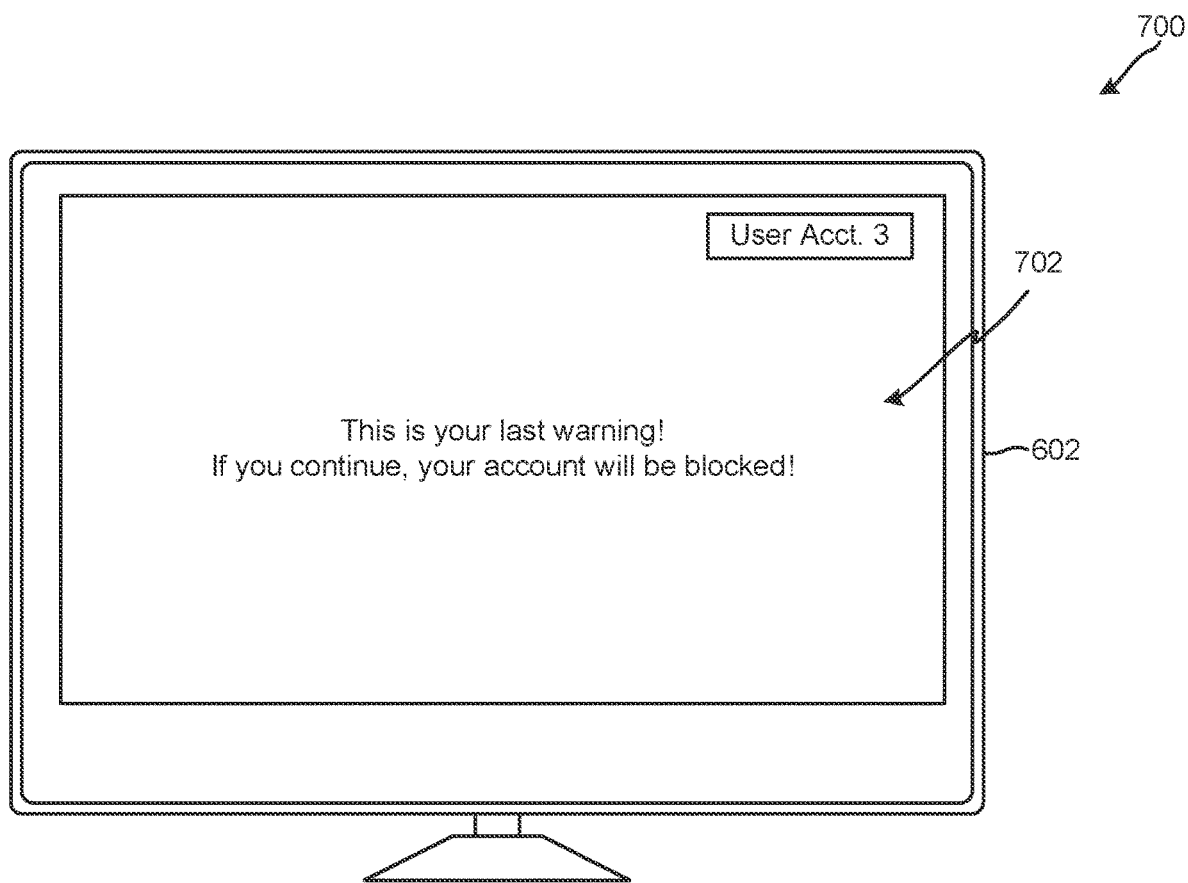
FIG. 7 is a diagram of an embodiment of a system to illustrate a notification that is provided to the adult user via a user account assigned to the adult user.
Figure 7:
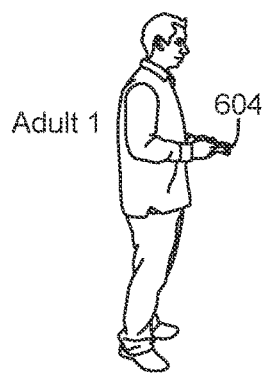

FIG. 7 is a diagram of an embodiment of a system 700 to illustrate a notification 702 that is provided to the adult 1 via the user account 3. The notification 702 is generated after the notification 604 (FIG. 6A) is generated. For example, the one or more processors of the computing device system determine whether the adult 1 continues the inappropriate behavior towards the child 1 via the user account accessed by the child 1 and the user account 3. To illustrate, the one or more processors of the computing device system determine whether additional inappropriate content is sent via the user accounts 3 and 2 or the user accounts 3 and 1 and the chat session during which the chat window 504 (FIG. 5) is displayed. In the example, upon determining so, the one or more processors of the computing device system generate display data for displaying the notification 702. The notification 702 indicates via the user account 3 that a last warning is being provided and that if the adult 1 continues the inappropriate behavior, the user account 3 will be blocked.

Figure 8A:
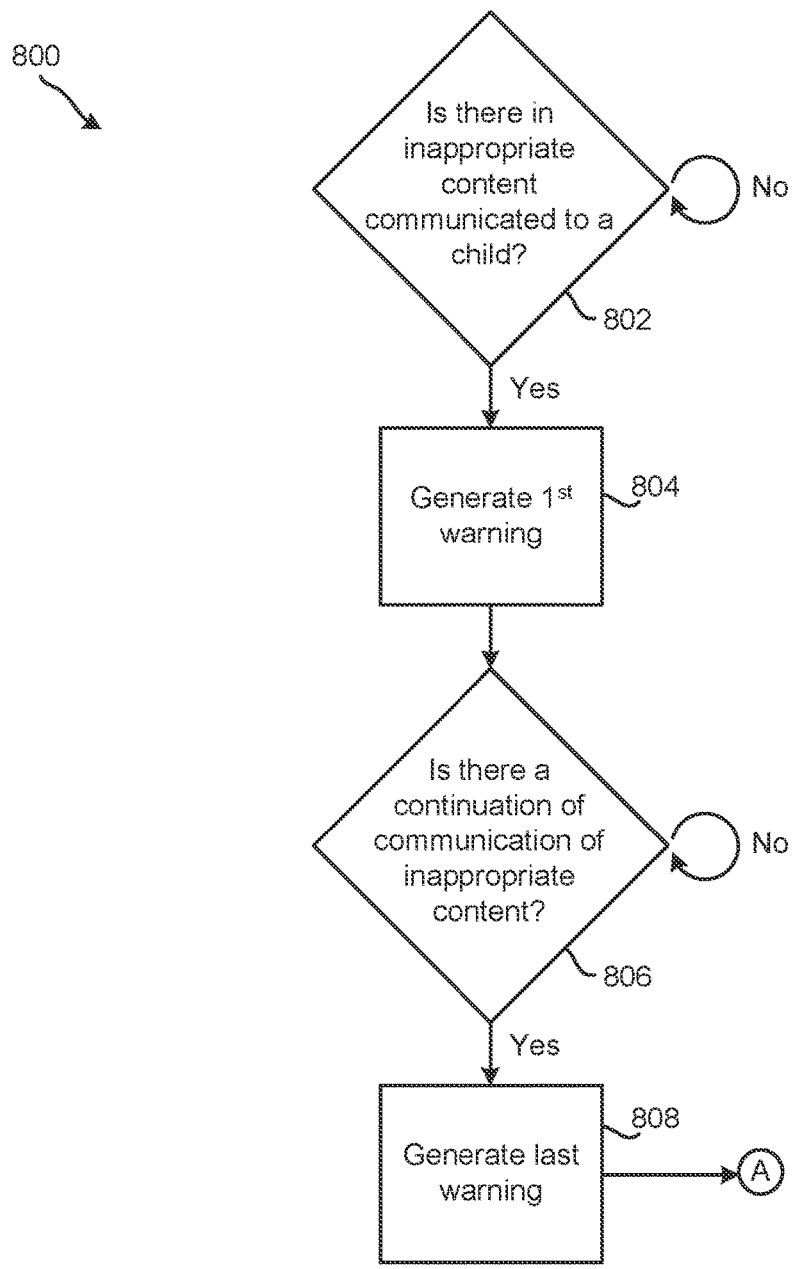
FIG. 8A is a diagram of an embodiment of a method for hindering use of the user account assigned to the adult user when the adult user provides the inappropriate content to a user account accessed by the child user and continues to do so over a time period.

FIG. 8A is a diagram of an embodiment of a method 800 for hindering use of the user account 3 assigned to the adult 1 when the adult 1 provides the inappropriate content to the user account, such as the user account 1 or the user account 2, accessed by the child 1, and continues to do so over a time period. The method 800 is executed by one or more processors of computing device system.

In an operation 802 of the method 800, the one or more processors of the computing device system determine whether the inappropriate content is communicated to the user account, such as the user account 2 (FIG. 6A) of the user account 1 (FIG. 1), that is accessed by the child 1. For example, a behavior profile model, such as an AI model, is trained using data to determine whether content received by the user account accessed by the child 1 is inappropriate. Further in the example, the one or more processors of the computing device system identify that the inappropriate content is generated by the user account 3 assigned to the adult 1 upon determining that the content received is inappropriate. To illustrate, the one or more processors of the computing device system send a request to the account server that generates and manages user accounts, such as the user accounts 1-3, to obtain an identity of the user account 3 that is accessed to generate the inappropriate content. In the illustration, upon receiving the request, the account server provides the identity of the user account 3 to the one or more processors of the computing device system.

Upon determining that the inappropriate content is not communicated to the user account accessed by the child 1, the one or more processors of the computing device system continue to make the determination. On the other hand, upon determining that the inappropriate content is communicated to the user account accessed by the child 1, the one or more processors of the computing device system execute an operation 804 of the method 800 to generate display data for displaying a first notification, such as a first warning. The one or more processors of the computing device system send the first warning to the user account 3. An example of the first warning is the notification 604 (FIG. 6A).

Moreover, in an operation 806 of the method, the one or more processors of the computing device system determine whether the additional inappropriate content is communicated from the user account 3, assigned to the adult 1, to the user account accessed by the child. For example, the behavior profile model determines whether content sent to the user account accessed by the child 1 is inappropriate. In the example, the content is sent to the user account accessed by the child 1 after the inappropriate content is sent in the operation 802.

In response to determining that the additional inappropriate content is not communicated to the user account accessed by the child 1, the one or more processors of the computing device system continue to make the determination. On the other hand, upon determining that the additional inappropriate content is communicated to the user account accessed by the child 1, the one or more processors of the computing device system execute an operation 808 of the method 800 to generate display data for displaying a final notification, such as a last warning. The one or more processors of the computing device system send the final notification to the user account 3. An example of the final notification is the notification 702 (FIG. 7).

In an embodiment, display data for displaying additional warnings between the first and the last warning are generated by the one or more processors of the computing device system upon determining that further inappropriate content is sent from the user account 3 to the user account accessed by the child 1. The further inappropriate content is sent after sending the inappropriate content of the operation 802 and before sending the additional inappropriate content of the operation 806.

Figure 8B:
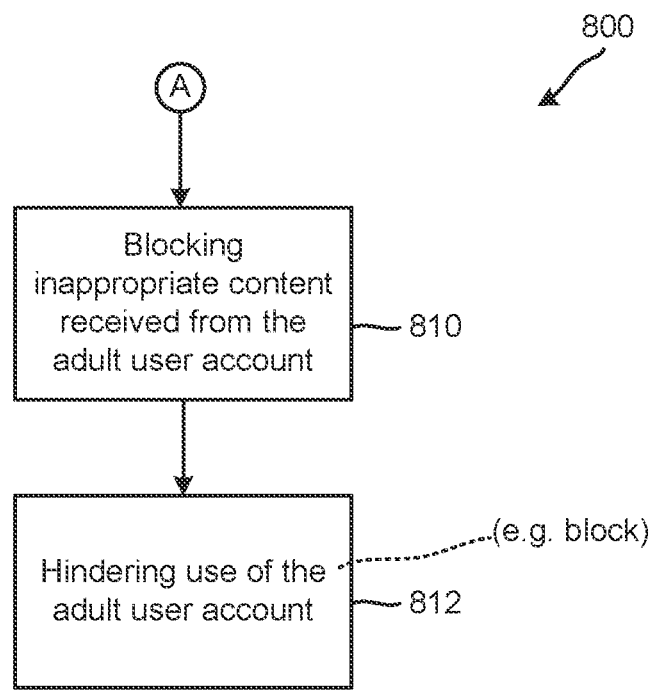
FIG. 8B is a continuation of the flowchart of the method of FIG. 8A.

FIG. 8B is a continuation of the flowchart of the method 800 of FIG. 8A. In an operation 810 of the method 800, the one or more processors of the computing device system block the inappropriate content and the additional inappropriate content received within the user account accessed by the child 1. For example, the one or more processors of the computing device system generate display data for displaying the overlay 652 (FIG. 6B) to block the inappropriate content. To illustrate, the one or more processors of the computing device system generate display data for increasing a size of the overlay 652 to cover the additional inappropriate content and the inappropriate content. Moreover, in the illustration, the one or more processors of the computing device system determine a location of display of the inappropriate content and the additional inappropriate content within the chat window 504. To further illustrate, the one or more processors of the computing device system send a request to a processor of the display device 102 to provide a location of display pixels of the display device 102 at which the inappropriate content and the additional inappropriate content are displayed. In the further illustration, in response to the request, the processor of the display device 102 provides the location of display pixels to the one or more processors of the computing device system. Moreover, in the further illustration, upon receiving the location, the one or more processors of the computing device system generates an instruction to display the increased size of the overlay 652 at the location of the display pixels, and sends the instruction with the display data for displaying the overlay 652 to the display device 102. In the further illustration, upon receiving instruction and the display data for displaying the overlay 652, the processor of the display device 102 displays the overlay 652 at the locations of the display pixel on top of the inappropriate content and the additional inappropriate content. In the illustration, the display data is sent to the user account accessed by the child 1 to display the overlay 652 in the chat window 504.

In an operation 812 the method 800, the one or more processors of the computing device system hinder use of the user account 3 assigned to the adult 1 for providing the inappropriate content and the additional inappropriate content to the user account accessed by the child 1. For example, the one or more processors of the computing device system disable access to the user account 3 used to access the chat session and one or more video games. To illustrate, the one or more processors of the computing device system send a request to the account server to block the access to the user account 3. In the illustration, upon receiving the request, the account server logs the adult 1 out of the user account 3, and does not allow additional instances of access to the user account 3 upon receiving user information to access the user account 3.

In one embodiment, in addition to or instead of any of the operations 804, 808, 810, and 812, the one or more processors of the computing device system generates a notification to the adult administrator, such as the parent of the child 1, regarding the inappropriate content of the operation 802 and the additional inappropriate content of the operation 806. For example, the one or more processors of the computing device system send an e-mail to the email account of the adult administrator to indicate that the inappropriate content and the additional inappropriate content is directed to the child 1 via the user account accessed by the child 1.

Figure 9:
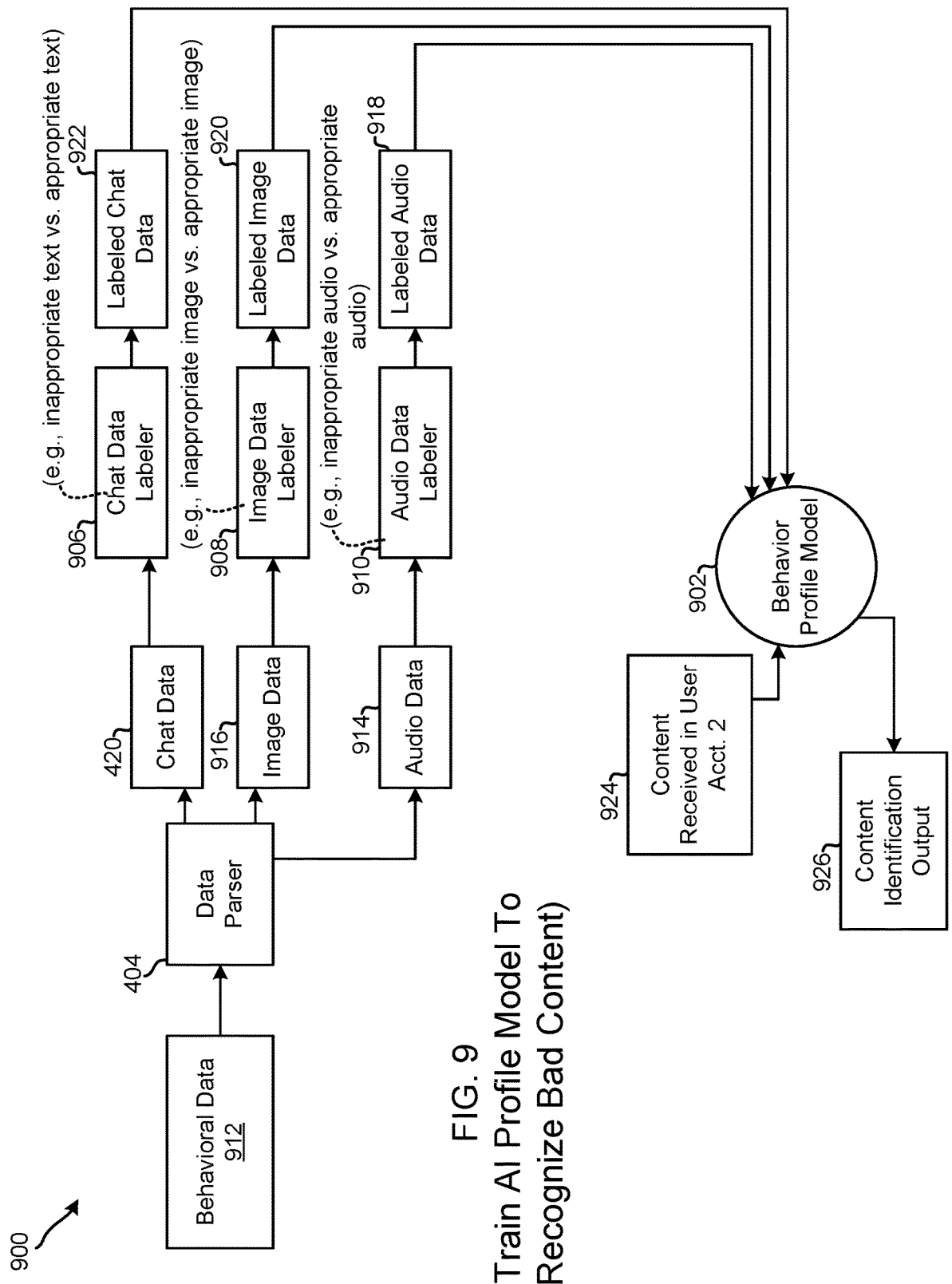
FIG. 9 is a diagram of an embodiment of a system to illustrate use of a behavior profile model to determine whether content that is provided to the user account accessed by the child user is inappropriate.

FIG. 9 is a diagram of an embodiment of a system 900 to illustrate use of a behavior profile model 902 to determine whether content that is provided to the user account accessed by the child 1 is inappropriate. The system 400 includes a data parser 404, a chat data labeler 906, an image data labeler 908, and an audio data labeler 910. As an example, each of the chat data labeler 906, the image data labeler 908, and the audio data labeler 910, and the behavior profile model 902 is a hardware component or a software component. To illustrate, each of the chat data labeler 906, the image data labeler 908, and the audio data labeler 910, and the behavior profile model 902 is a software program or a portion of a software program that is executed by an AI processor. To further illustrate, the behavior profile model 902 is a machine learning model or a neural network or an AI model. As another illustration, each of the chat data labeler 906, the image data labeler 908, and the audio data labeler 910, and the behavior profile model 902 is a hardware circuit portion of an ASIC or a PLD. As yet another illustration, each of the chat data labeler 906, the image data labeler 908, and the audio data labeler 910, and the behavior profile model 902 are examples of the one or more processors of the computing device system.

The data parser 404 is coupled to the chat data labeler 906, the image data labeler 908, and the audio data labeler 910. Moreover, the chat data labeler 906, the image data labeler 908, and the audio data labeler 910 are coupled to the behavior profile model 902.

The data parser 404 receives behavioral data 912. For example, the data parser 404 receives audio data 914, such as the voice data 416 (FIG. 4) and one or more audio files that are posted to user accounts during the one or more game sessions. In the example, the audio data 914 includes audio characteristics, such as amplitudes or frequencies or a combination thereof. In the example, the one or more audio files are posted to chat sessions accessed upon accessing the user accounts. As another example, the data parser 404 receives image data 916, which includes the image data 418 (FIG. 4) and image data that is posted during the one or more game sessions to user accounts. As yet another example, the data parser 404 receives the chat data 420.

The data parser 404 parses the behavioral data 912 to identify the audio data 914, the image data 916, and the chat data 420. As an example, upon determining that data within the behavioral data 912 includes the audio characteristics, such as amplitudes and frequencies, the data parser 404 determines that the data is the audio data 914. Further in the example, in response to determining that data within the image data 916 includes image characteristics, such as shapes of body part features, locations of the body part features, color, intensities, and texture, the data parser 404 determines that the data is the image data 916. The one or more processors of the computing device system provide the chat data 420 to the chat data labeler 906. Similarly, the one or more processors of the computing device system provide the image data 916 to the image data labeler 908 and provide the audio data 914 to the audio data labeler 910.

The audio data labeler 910 determines terms, such as words or phrases or slangs or sentences or statements, from the audio data 914. For example, the audio data labeler 910 integrates the amplitudes and frequencies of the audio data 914 to determine the terms. The audio data labeler 910 then compares the terms within the audio data 914 with predetermined terms to identify a first set of appropriate audio data and a second set of inappropriate audio data. For example, the audio data labeler 910 compares the terms within the audio data 914 with terms provided in a guide to determine whether the terms are appropriate or inappropriate. To illustrate, the audio data labeler 910 accesses the guide that is provided by a video gaming industry or by an organization that protects children against bad behavior. In the illustration, the guide is accessed from a server that is controlled or managed by the video gaming industry or the organization that protects children against bad behavior. In the illustration, upon determining that the terms in the audio data 914 are indicated by the guide as inappropriate, the audio data labeler 910 determines that the terms are inappropriate. Further, in the illustration, on the other hand, upon determining that the terms in the audio data 914 are indicated by the guide as appropriate, the audio data labeler 910 determines that the terms are appropriate. In the illustration, the audio data labeler 910 identifies a first set of the terms that are appropriate and a second set of the terms that are inappropriate. In the illustration, the first set of terms is an example of the first set of appropriate audio data and the second set of terms is an example of the second set of appropriate audio data. In the illustration, the audio data labeler 910 assigns a first audio data identifier to the first set of terms to indicate that the first set of terms are appropriate and assigns a second audio data identifier to the second set of terms to indicate that the second set of terms are inappropriate. Also, in the illustration, the first audio data identifier, the second audio data identifier, the first set of terms, and the second set of terms are output as labeled audio data 918.

The image data labeler 908 determines body parts from the image data 916. For example, the image data labeler 908 identifies that the image data 916 includes a finger based on a comparison of a shape of the finger with a predetermined shape. As another example, the image data labeler 908 identifies that the image data 916 includes a face based on a comparison of a shape of the face with a predetermined shape. The body parts determined from the image data 916 have body part expressions, such as expressions made using fingers or expressions made using faces.

The image data labeler 908 then compares the body part expressions, within the image data 916, with a first set of predetermined body part expressions to identify a first set of appropriate body part expressions, and compares the body part expressions with a second set of predetermined body part expressions to identify a second set of inappropriate body part expressions. For example, upon determining that shapes of some of the body part expressions identified from the image data 916 are within a predetermined threshold from or the same as shapes of the first set of predetermined body part expressions, the image data labeler 908 determines that the body part expressions identified from the image data 916 are the first set of appropriate body part expressions. In the example, on the other hand, upon determining that shapes of some of the body part expressions identified from the image data 916 are within the predetermined threshold from or the same as shapes of the second set of predetermined body part expressions, the image data labeler 908 determines that the body part expressions identified from the image data 916 are the second set of inappropriate body part expressions. In the example, the image data labeler 908 assigns a first image data identifier to the first set of appropriate body part expressions to indicate that the first set of appropriate body part expressions are appropriate and assigns a second image data identifier to the second set of inappropriate body part expressions to indicate that the second set of inappropriate body part expressions are inappropriate. Also, in the example, the first image data identifier, the second image data identifier, the first set of appropriate body part expressions, and the second set of inappropriate body part expressions are output as labeled image data 920.

The chat data labeler 906 identifies terms, such as words or phrases or sentences or statements or icons or symbols or slangs, from the chat data 420. The chat data labeler 906 compares the terms within the chat data 420 with predetermined terms to identify a first set of appropriate chat data and a second set of inappropriate chat data. For example, the chat data labeler 906 compares the terms within the chat data 420 with terms provided in the guide to determine whether the terms are appropriate or inappropriate in the same manner in which the audio data labeler 910 compares the terms within the audio data 914 to determine whether the terms within the audio data 914 are appropriate or inappropriate. In the example, some of the terms within the chat data 420 that are appropriate are examples of the first set of appropriate chat data and remaining ones of the terms within the chat data 420 that are inappropriate are examples of the second set of inappropriate chat data. In the illustration, the chat data labeler 906 assigns a first chat data identifier to the terms within the audio data 914 that are appropriate and a second chat data identifier to the remaining terms within the audio data 914 that are inappropriate. Also, in the illustration, the first chat data identifier, the second chat data identifier, the first set of appropriate chat data, and the second set of inappropriate chat data are output as labeled chat data 920.

It should be noted that upon identifying or determining the labeled audio data 918 from the audio data 914, the audio data 914 is discarded by the audio data labeler 910. For example, any audio files having the audio data 914 are deleted by the one or more processors of the computing device system from the one or more memory devices of the computing device system. Similarly, upon identifying or determining the labeled image data 920 from the image data 916, any images files having the image data 916 are deleted by the one or more processors of the computing device system from the one or more memory devices of the computing device system. Also, upon identifying or determining the labeled chat data 922 from the chat data 420, any files having the chat data 420 are deleted by the one or more processors of the computing device system from the one or more memory devices of the computing device system.

The behavior profile model 902 is trained based on the labeled audio data 918, the labeled image data 920, and the labeled chat data 922. For example, the behavior profile model 902 receives the labeled audio data 918, the labeled image data 920, and the labeled chat data 922, and learns that the first set of appropriate audio data is appropriate, the second set of inappropriate audio data is inappropriate, the first set of appropriate body part expressions are appropriate, the second set of inappropriate body part expressions are inappropriate, the first set of appropriate chat data is appropriate, and the second set of inappropriate chat data is inappropriate.

The behavior profile model 902 accesses content 924 received via the user account, such as the user account 1 (FIG. 1) or the user account 2 (FIG. 5), that is accessed by the child 1 to access a game session of a video game, such as the scene 502 (FIG. 5). Examples of the content 924 include audio data or image data or chat data or a combination thereof that is received, within the user account accessed by the child 1, during a chat session occurring during the game session of the video game. To illustrate, the content 924 includes the comment 512 or the comment 514 (FIG. 5) or a combination thereof.

The behavior profile model 902 compares the content 924 with the first set of appropriate audio data, the second set of inappropriate audio data, the first set of appropriate body part expressions, the second set of inappropriate body part expressions, the first set of appropriate chat data, and the second set of inappropriate chat data to output content identification output 926. As an example, the behavior profile model 902 determines or identifies terms from the audio data of the content 924 in the same manner in which the terms are determined from the audio data 914. Further, in the example, the behavior profile model 902 determines whether terms of the content 924 are similar to or the same as the first set of appropriate audio data or the second set of inappropriate audio data. To illustrate, the behavior profile model 902 determines whether the terms, determined from the content 924, match the terms of the first set of appropriate audio data or the second set of inappropriate audio data. In the illustration, upon determining that the terms, determined from the content 924, match the terms of the first set of appropriate audio data, the behavior profile model 902 determines that the audio data of the content 924 is appropriate. On the other hand, in the illustration, upon determining that the terms, determined from the content 924, match the terms of the second set of inappropriate audio data, the behavior profile model 902 determines that the audio data of the content 924 is inappropriate. In the illustration, the determination that the audio data of the content 924 is appropriate or inappropriate is an example of the content identification input 926.

As another example, the behavior profile model 902 accesses the image data from the content 924 and determines or identifies body part expressions from the image data in the same manner in which the body part expressions are determined or identified from the image data 916. Further, in the example, the behavior profile model 902 determines whether the body part expressions of the content 924 are similar to or the same as the first set of appropriate body part expressions or the second set of inappropriate body part expressions. To illustrate, the behavior profile model 902 determines whether the body part expressions, determined or identified from the content 924, match the first set of appropriate body part expressions or the second set of inappropriate body part expressions. In the illustration, upon determining that the body part expressions, determined or identified from the content 924, match the first set of appropriate body part expressions, the behavior profile model 902 determines that the body part expressions of the content 924 are appropriate. On the other hand, in the illustration, upon determining that the body part expressions, determined or identified from the content 924, match the second set of inappropriate body part expressions, the behavior profile model 902 determines that the body part expressions of the content 924 are inappropriate. In the illustration, the determination that the body part expressions of the content 924 is appropriate or inappropriate is an example of the content identification input 926.

As another illustration, the behavior profile model 902 determines whether a shape of a body part expression, determined or identified from the content 924, has an outline having a predetermined number of sample points and each of the sample points is within a predetermined distance from a corresponding sample point of a body part expression of the first set of appropriate body part expressions. If so, the behavior profile model 902 determines that the shape of the body part expression, determined or identified from the content 924, is similar to the shape of the body part expression of the first set of appropriate body part expressions. On the other hand, upon determining that one or more of the sample points is not within the predetermined distance from the corresponding sample point of the body part expression of the first set of appropriate body part expressions, the behavior profile model 902 determines that the shape of the body part expression, determined or identified from the content 924, is not similar to the shape of the body part expression of the first set of appropriate body part expressions. As yet another illustration, the behavior profile model 902 determines whether a shape of a body part expression, determined or identified from the content 924, has an outline having a predetermined number of sample points and each of the sample points is within a predetermined distance from a corresponding sample point of a body part expression of the second set of inappropriate body part expressions. If so, the behavior profile model 902 determines that the shape of the body part expression, determined or identified from the content 924, is similar to the shape of the body part expression of the second set of appropriate body part expressions. On the other hand, upon determining that one or more of the sample points is not within the predetermined distance from the corresponding sample point of the body part expression of the second set of inappropriate body part expressions, the behavior profile model 902 determines that the shape of the body part expression, determined or identified from the content 924, is not similar to the shape of the body part expression of the second set of inappropriate body part expressions.

As another example, the behavior profile model 902 determines or identifies terms from the chat data of the content 924 in the same manner in which the terms are determined from the chat data 420. Further, in the example, the behavior profile model 902 determines whether terms of the content 924 are similar to or the same as the first set of appropriate chat data or the second set of inappropriate chat data. To illustrate, the behavior profile model 902 determines whether the terms, determined from the content 924, match the terms of the first set of appropriate chat data or the second set of inappropriate chat data. In the illustration, upon determining that the terms, determined from the content 924, match the terms of the first set of appropriate chat data, the behavior profile model 902 determines that the chat data of the content 924 is appropriate. On the other hand, in the illustration, upon determining that the terms, determined from the content 924, match the terms of the second set of inappropriate chat data, the behavior profile model 902 determines that the chat data of the content 924 is inappropriate. In the illustration, the determination that the chat data of the content 924 is appropriate or inappropriate is an example of the content identification input 926.

As yet another example, a combination of the appropriateness of the chat data, the image data, and the audio data of the content 924 and the inappropriateness of the chat data, the image data, and the audio data of the content 924 is used to determine whether the content 924 is appropriate or inappropriate. For example, upon determining that two or more of the chat data, the image data, and the audio data of the content 924 received during a game session accessed via the user account, such as the user account 1 or 2, that is accessed by the child 1 is appropriate, the behavior profile model 902 determines that the content 924 received within the user account is appropriate. On the other hand, upon determining that two or more of the chat data, the image data, and the audio data of the content 924 received during the game session accessed via the user account that is accessed by the child 1 is inappropriate, the behavior profile model 902 determines that the content 924 received within the user account is inappropriate.

Figure 10:
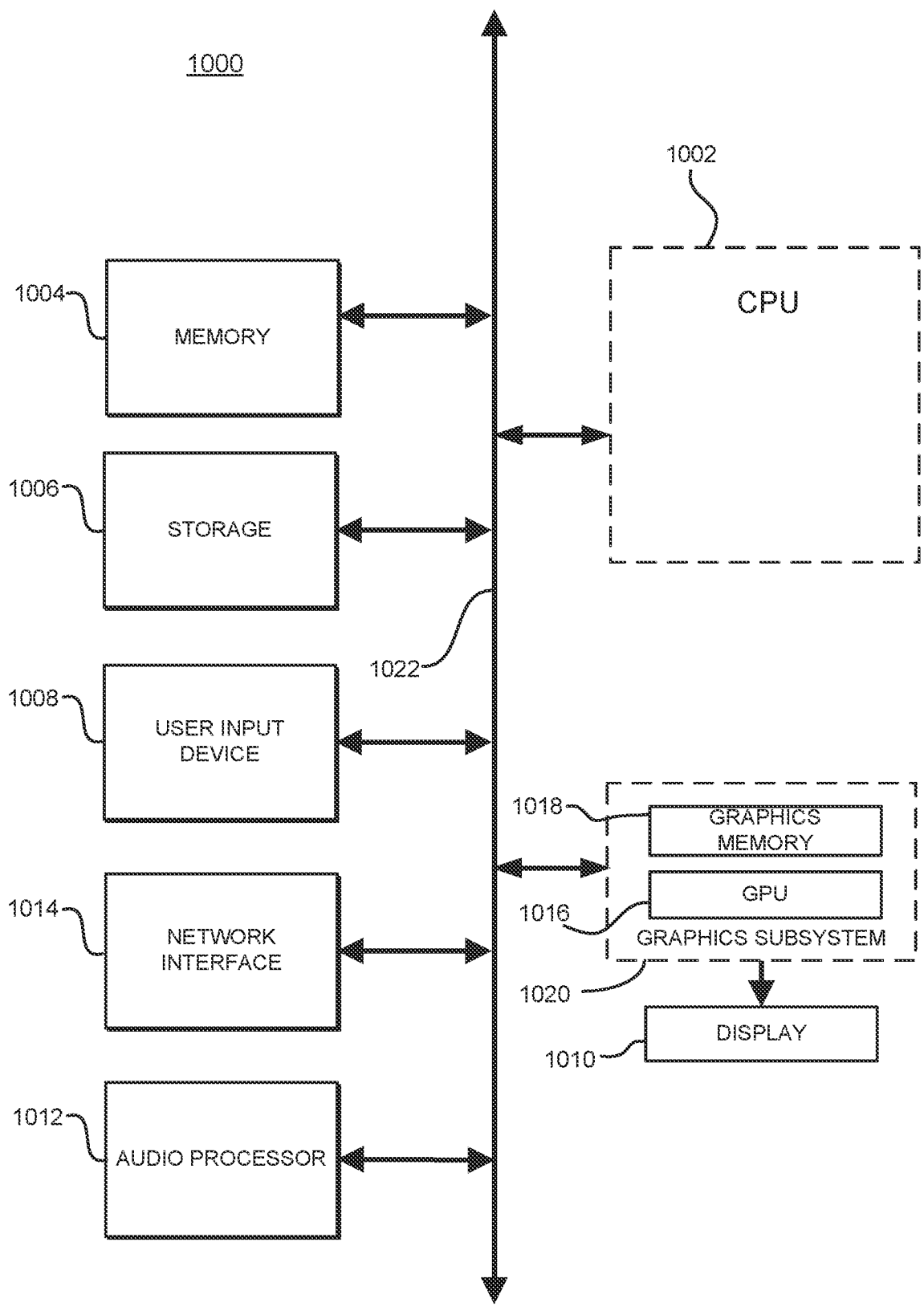
FIG. 10 illustrates components of an example device that can be used to implement the various embodiments of the present disclosure.

FIG. 10 illustrates components of an example device 1000 that can be used to perform aspects of the various embodiments of the present disclosure. This block diagram illustrates the device 1000 that can incorporate or can be a personal computer, video game console, personal digital assistant, a server or other digital device, suitable for practicing an embodiment of the disclosure. The device 1000 includes a CPU 1002 for running software applications and optionally an operating system. The CPU 1002 includes one or more homogeneous or heterogeneous processing cores. For example, the CPU 1002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 1000 can be a localized to a player playing a game segment (e.g., game console), or remote from the player (e.g., back-end server processor), or one of many servers using virtualization in a game cloud system for remote streaming of gameplay to clients.

A memory 1004 stores applications and data for use by the CPU 1002. A storage 1006 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 1008 communicate user inputs from one or more users to the device 1000. Examples of the user input devices 1008 include keyboards, mouse, joysticks, touch pads, touch screens, still or video recorders/cameras, tracking devices for recognizing gestures, and/or microphones. A network interface 1014 allows the device 1000 to communicate with other computer systems via an electronic communications network, and may include wired or wireless communication over local area networks and wide area networks, such as the internet. An audio processor 1012 is adapted to generate analog or digital audio output from instructions and/or data provided by the CPU 1002, the memory 1004, and/or data storage 1006. The components of device 1000, including the CPU 1002, the memory 1004, the data storage 1006, the user input devices 1008, the network interface 1010, and an audio processor 1012 are connected via a data bus 1022.

A graphics subsystem 1020 is further connected with the data bus 1022 and the components of the device 1000. The graphics subsystem 1020 includes a graphics processing unit (GPU) 1016 and a graphics memory 1018. The graphics memory 1018 includes a display memory (e.g., a frame buffer) used for storing pixel data for each pixel of an output image. The graphics memory 1018 can be integrated in the same device as the GPU 1016, connected as a separate device with the GPU 1016, and/or implemented within the memory 1004. Pixel data can be provided to the graphics memory 1018 directly from the CPU 1002. Alternatively, the CPU 1002 provides the GPU 1016 with data and/or instructions defining the desired output images, from which the GPU 1016 generates the pixel data of one or more output images. The data and/or instructions defining the desired output images can be stored in the memory 1004 and/or the graphics memory 1018. In an embodiment, the GPU 1016 includes three-dimensional (3D) rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1014 periodically outputs pixel data for an image from the graphics memory 1018 to be displayed on the display device 1010. The display device 1010 can be any device capable of displaying visual information in response to a signal from the device 1000, including a cathode ray tube (CRT) display, a liquid crystal display (LCD), a plasma display, and an organic light emitting diode (OLED) display. The device 1000 can provide the display device 1010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for restricting a play of an adult video game accessed via an adult user account by a child, comprising:
receiving, from a client device via a computer network, an indication of access to the adult video game via the adult user account;
receiving, via the computer network, data identifying an age of a user from the client device, wherein the data identifying the age of the user is received during the access to the adult video game;
determining, by an artificial intelligence model, that the user accessing the adult video game via the adult user account is the child after receiving the indication of the access to the adult video game, wherein said determining that the user accessing the adult video game via the adult user account is the child occurs based on the data identifying the age of the user and based on data identifying a plurality of ages of a plurality of other users, wherein the artificial intelligence model is trained based on the data identifying the plurality of ages of the plurality of other users after receiving the data identifying the plurality of ages of the plurality of other users from a plurality of client devices via the computer network; and
restricting the child from playing the adult video game via the adult user account upon determining that the user accessing the adult video game is the child.

2. The method of claim 1, wherein the adult user account is assigned to an adult.

3. The method of claim 1, wherein the data identifying the age of the user includes image data regarding the user, or voice data regarding the user, or gameplay data associated with the user, or chat data associated with the user, or a combination thereof.

4. The method of claim 1, wherein said restricting the child includes blocking access to the adult user account, or providing a notification via the adult user account to stop accessing the adult video game, or implementing parental controls within the adult user account, or blocking content displayed via the adult user account, or notifying an adult of the access by the child of the adult video game via the adult user account, or a combination thereof.

5. The method of claim 1, wherein said determining whether the user accessing the adult video game via the adult user account is the child includes determining whether the age of the user is below a predetermined threshold.

6. A server for restricting a play of an adult video game accessed via an adult user account by a child, comprising:
a processor configured to:
receive, from a client device via a computer network, an indication of access to the adult video game via the adult user account;
receive, via the computer network, data identifying an age of a user from the client device, wherein the data identifying the age of the user is received during the access to the adult video game;
determine, using an artificial intelligence model, that the user accessing the adult video game via the adult user account is the child after receiving the indication of the access to the adult video game, wherein the determination that the user accessing the adult video game via the adult user account is the child occurs based on the data identifying the age of the user and based on data identifying a plurality of ages of a plurality of other users, wherein the artificial intelligence model is trained based on the data identifying the plurality of ages of the plurality of other users after the data identifying the plurality of ages of the plurality of other users is received by the artificial intelligence model from a plurality of client devices via the computer network; and
restrict the child from playing the adult video game via the adult user account upon determining that the user accessing the adult video game is the child; and
a memory device coupled to the processor.

7. The server of claim 6, wherein the adult user account is assigned to an adult.

8. The server of claim 6, wherein the data identifying the age of the user includes image data regarding the user, or voice data regarding the user, or gameplay data associated with the user, or chat data associated with the user, or a combination thereof.

9. The server of claim 6, wherein to restrict the child, the processor is configured to block access to the adult user account, or provide a notification via the adult user account to stop accessing the adult video game, or implement parental controls within the adult user account, or block content displayed via the adult user account, or notify an adult of the access by the child of the adult video game via the adult user account, or a combination thereof.

10. The server of claim 6, wherein to determine whether the user accessing the adult video game via the adult user account is the child, the processor is configured to determine whether the age of the user is below a predetermined threshold.

11. A client device for restricting a play of an adult video game accessed via an adult user account by a child, comprising:
a processor configured to:
send an indication of access to the adult video game via the adult user account via a computer network to a server system;
receive data identifying an age of a user, wherein the data identifying the age of the user is received during the access to the adult video game;
send the data identifying the age of the user via the computer network to the server system;
receive, from an artificial intelligence model of the server system, an indication that the user accessing the adult video game via the adult user account is the child after the indication of the access to the adult video game and the data identifying the age of the user are sent to the server system, wherein the indication that the user accessing the adult video game via the adult user account is the child is generated by the artificial intelligence model based on the data identifying the age of the user and based on data identifying a plurality of ages of a plurality of other users, wherein the data identifying the plurality of ages is provided from a plurality of client devices via the computer network to the artificial intelligence model to train the artificial intelligence model; and restrict the child from playing the adult video game upon receiving the indication that the user accessing the adult video game via the adult user account is the child; and a memory device coupled to the processor.

12. The client device of claim 11, wherein the adult user account is assigned to an adult.

13. The client device of claim 11, wherein the data identifying the age of the user includes image data regarding the user, or voice data regarding the user, or gameplay data associated with the user, or chat data associated with the user, or a combination thereof.

14. The client device of claim 11, wherein to restrict the child, the processor is configured to block access to the adult user account, or provide a notification via the adult user account to stop accessing the adult user account, or implement parental controls within the adult user account, or block content displayed via the adult user account, or notify an adult of the access by the child of the adult video game via the adult user account, or a combination thereof.

15. The client device of claim 11, wherein the indication that the user accessing the adult user account is the child is received after a determination is made, by the artificial intelligence model, that the age of the user is below a predetermined threshold.

16. The method of claim 1, wherein the artificial intelligence model is trained based on a comparison of the data identifying the plurality of ages of the plurality of other users with the data identifying the age of the user.

17. The server of claim 6, wherein the artificial intelligence model is trained based on a comparison of the data identifying the plurality of ages of the plurality of other users with the data identifying the age of the user.

* * * * *